United States Patent
Berz

(10) Patent No.: US 10,823,547 B2
(45) Date of Patent: Nov. 3, 2020

(54) METHOD FOR DETERMINING A PHASE OF AN INPUT BEAM BUNDLE

(71) Applicant: Martin Berz, Munich (DE)

(72) Inventor: Martin Berz, Munich (DE)

( * ) Notice: Subject to any disclaimer, the term of this patent is extended or adjusted under 35 U.S.C. 154(b) by 0 days.

(21) Appl. No.: 16/307,002

(22) PCT Filed: Jun. 1, 2017

(86) PCT No.: PCT/EP2017/063270
§ 371 (c)(1),
(2) Date: Dec. 4, 2018

(87) PCT Pub. No.: WO2017/211665
PCT Pub. Date: Dec. 14, 2017

(65) Prior Publication Data
US 2019/0219378 A1     Jul. 18, 2019

(30) Foreign Application Priority Data

Jun. 6, 2016  (DE) .................. 10 2016 110 362

(51) Int. Cl.
   *G01B 9/02*   (2006.01)
   *G01B 9/021*  (2006.01)
   *G03H 1/04*   (2006.01)

(52) U.S. Cl.
   CPC ......... *G01B 9/021* (2013.01); *G01B 9/02097* (2013.01); *G03H 1/0443* (2013.01); *G03H 2001/0454* (2013.01)

(58) Field of Classification Search
   CPC .. G01B 9/021; G01B 9/02097; G03H 1/0443; G03H 2001/0454
   See application file for complete search history.

(56) References Cited

U.S. PATENT DOCUMENTS

| | | |
|---|---|---|
| 4,396,289 A | 8/1983 | Fantone |
| 2005/0259914 A1 | 11/2005 | Padgett et al. |
| (Continued) | | |

FOREIGN PATENT DOCUMENTS

WO     2001023965     4/2001

OTHER PUBLICATIONS

International Search Report corresponding to International Patent Application No. PCT/EP2017/063270, dated Sep. 25, 2017.

(Continued)

*Primary Examiner* — Hwa Andrew Lee
(74) *Attorney, Agent, or Firm* — McAndrews, Held & Malloy, Ltd.

(57) ABSTRACT

A method is presented for determining a phase of an input beam (110, $E_{in}$) without a reference ray. In the method, an input beam (110, $E_{in}$) having a plurality of input rays is split into a main beam (112, E1) and a reference beam (114, E2) in such a way that each input ray is split into a main ray of the main beam (112, E1) and a comparative ray of the reference beam (114, E2). The main beam (112, E1) is propagated along a first interferometer arm, and the reference beam (114, E2) is propagated along the second interferometer arm. The propagated main beam (112, E1) and the propagated reference beam (114, E2) are superposed to form an interference beam having a plurality of interference rays. The propagation along the first and second interferometer arms is carried out such that at least one interference ray of the interference beam is a superposition of a main ray of the propagated main beam (112, E1) assigned to a first input ray of the input beam (110, $E_{in}$), and of a comparative ray of the propagated reference beam (114, E2) assigned to a second input ray of the input beam (110, $E_{in}$) different from the first input ray.

10 Claims, 9 Drawing Sheets

(56) References Cited

U.S. PATENT DOCUMENTS

| | | |
|---|---|---|
| 2010/0103309 A1 | 4/2010 | Stern |
| 2012/0116703 A1 | 5/2012 | Pavillon et al. |
| 2013/0070251 A1* | 3/2013 | Das .................... G03H 1/0443 |
| | | 356/457 |
| 2014/0270456 A1 | 9/2014 | Khare et al. |
| 2015/0268628 A1* | 9/2015 | Sato .................... G02B 21/365 |
| | | 356/457 |
| 2016/0131882 A1* | 5/2016 | Wallace ............. G02B 21/0056 |
| | | 356/458 |
| 2018/0024008 A1* | 1/2018 | Okamoto ................. G01J 9/02 |
| | | 356/457 |

OTHER PUBLICATIONS

Pedrini et la., "Digital holography of self-luminous objects by using a Mach-Zehnder setup", Optics Letters, Feb. 15, 2012, vol. 37, No. 4, pp. 713-715.

Du et la., "Real-time determination of beam propagation factor by Mach-Zehnder point diffraction interferometer." Optics Communications, vol. 287, pp. 1-5, 2013.

Grilli et al., "Whole optical wavefields reconstruction by Digital Holography", Optics Express, pp. 294-302, Sep. 10, 2001 XP002364435.

Fu et al., "Phase difference amplification of double-exposure holograms", Optics Communications, Aug. 15, 1988, pp. 419-420. XP002109771.

Office action corresponding to German Patent Application No. 102016110362.4, dated Feb. 17, 2017.

\* cited by examiner

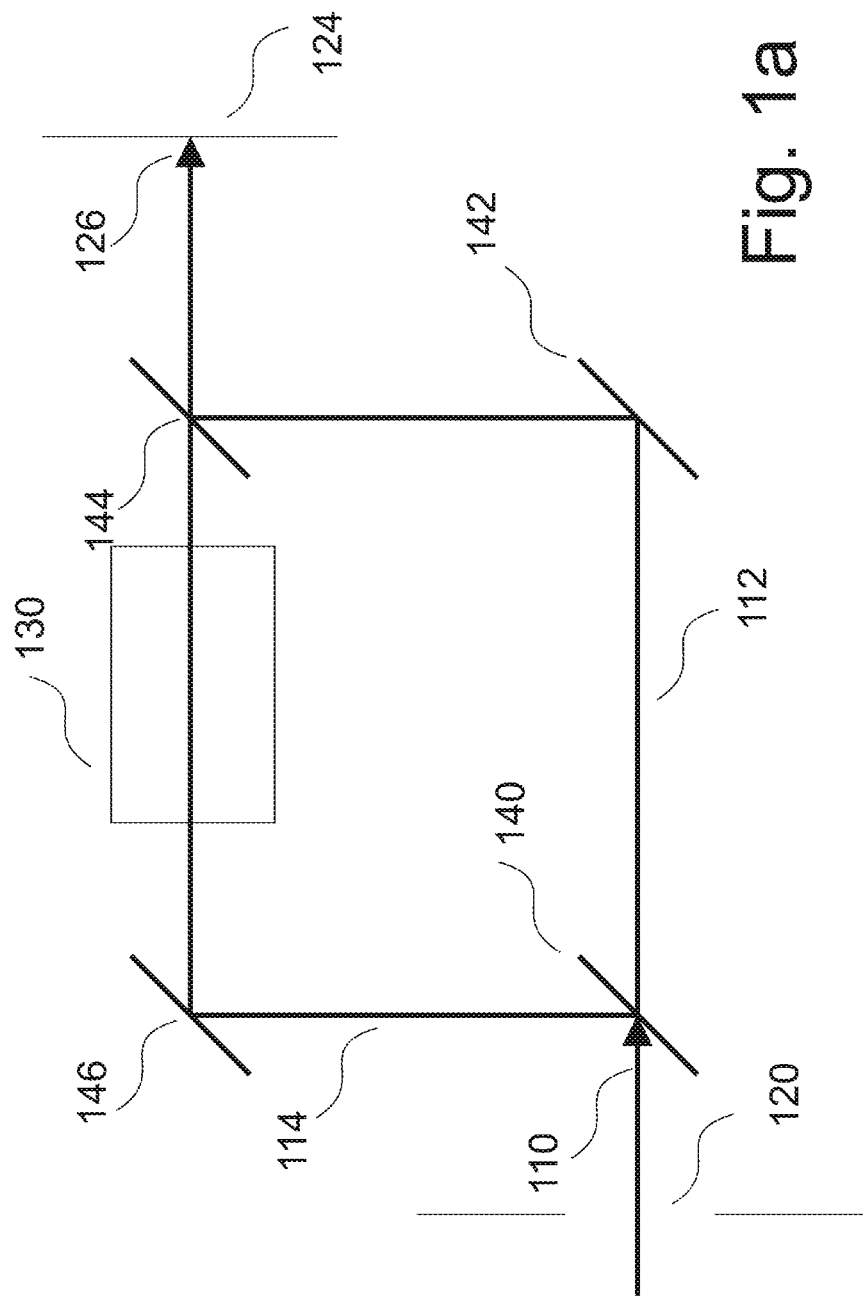

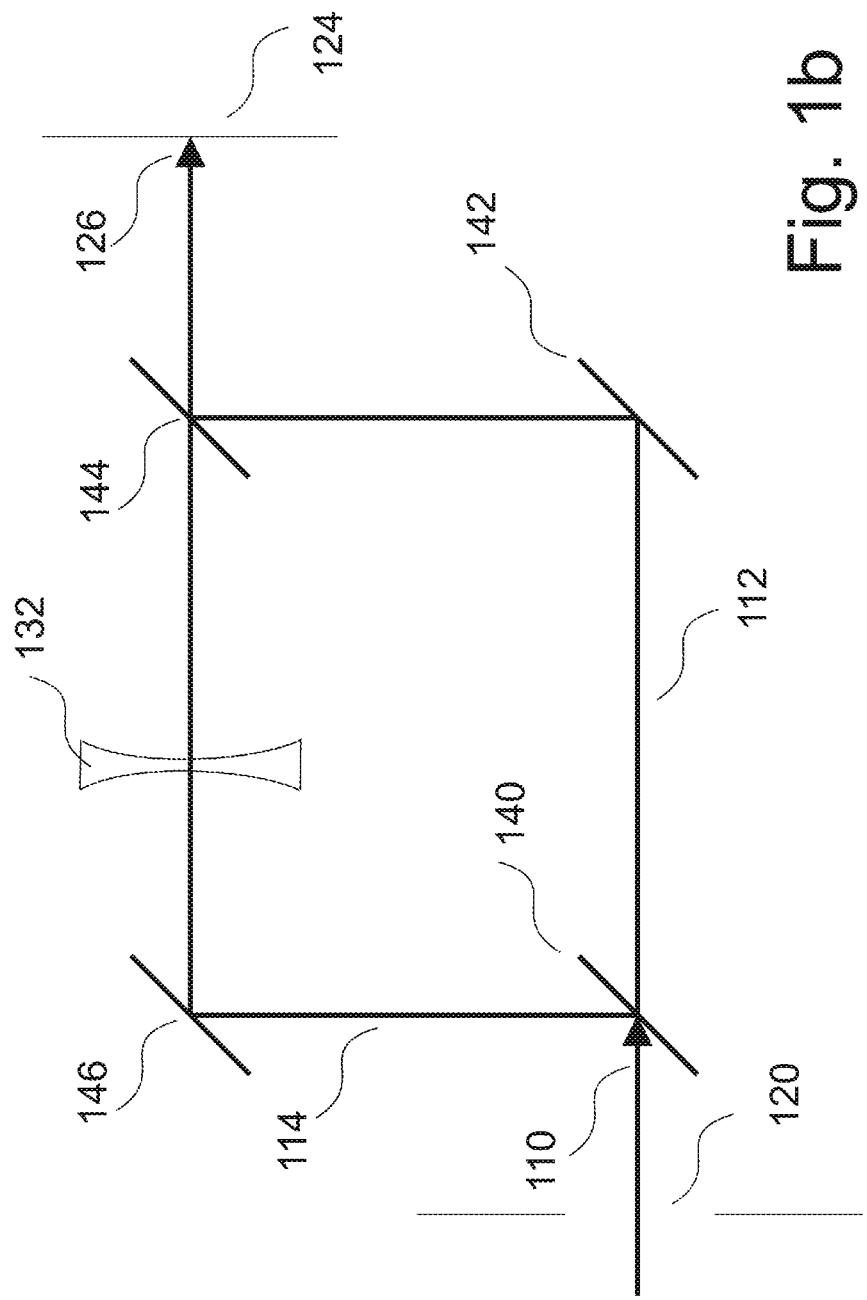

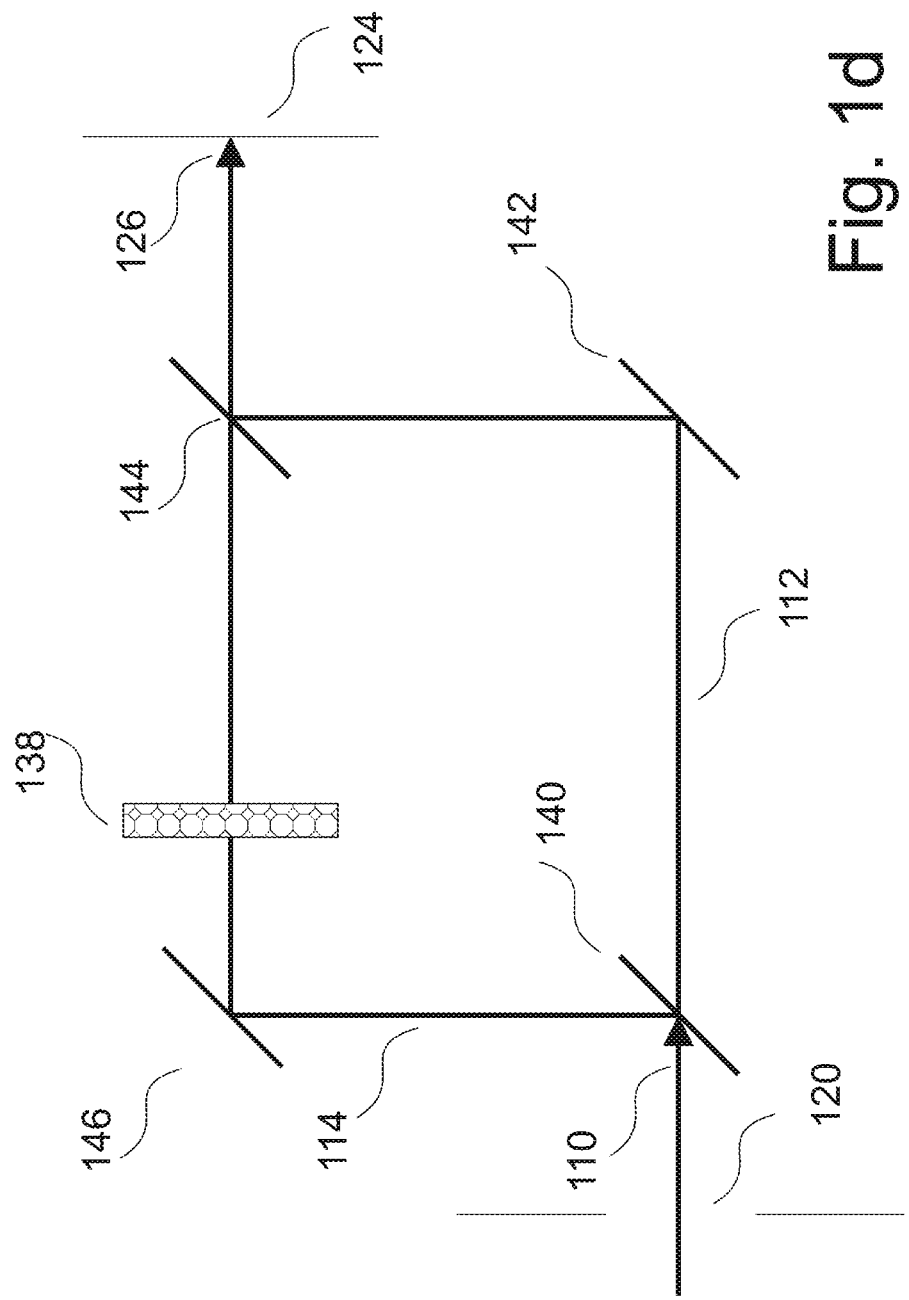

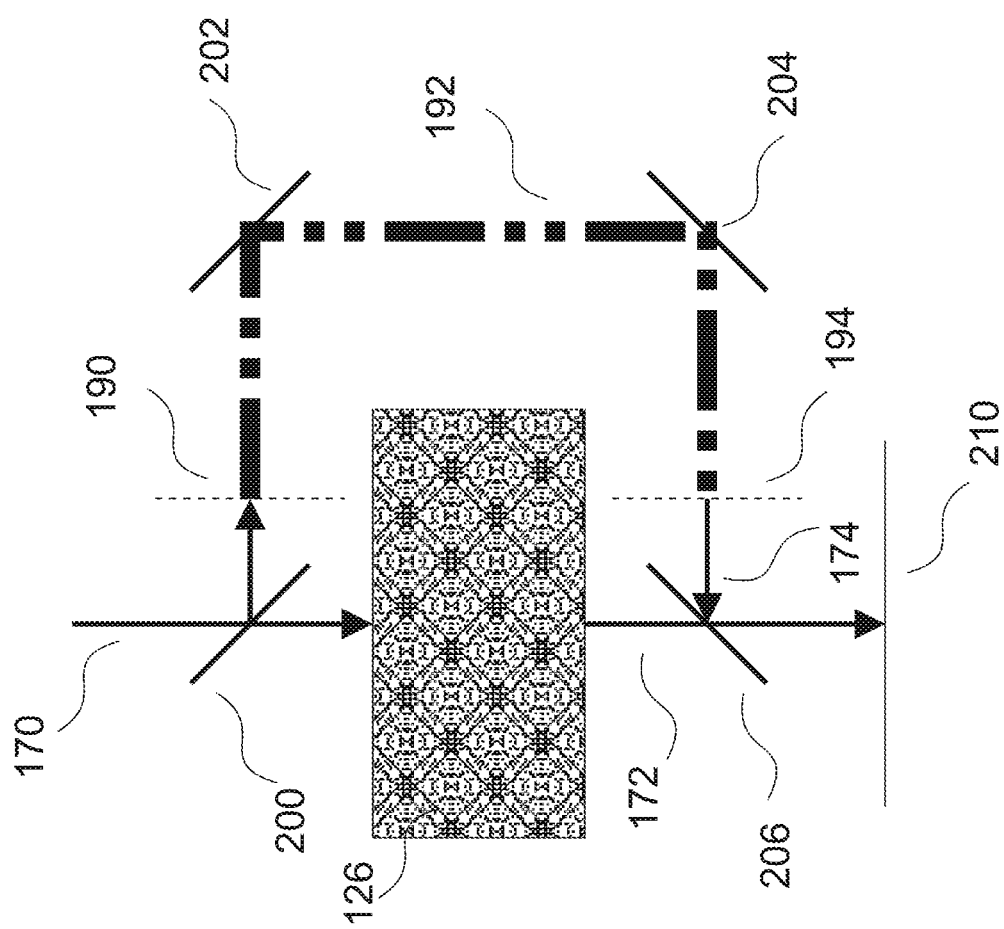

METHOD FOR DETERMINING A PHASE OF AN INPUT BEAM BUNDLE

The invention relates to a method for determining at least one phase of an input beam, the method being carried out without a reference ray. The method can be carried out with an interferometer or an interferometer system. The method can be used for the holographic imaging of an object.

An interferometer system or an interferometer can be understood in this case and below to mean a device, a set-up and/or a structure by means of which an interferometric measurement is made possible. It is not absolutely necessary, that this device, this set-up or this structure already carries out an interferometric measurement. Known interferometers are, for example, the Michelson interferometer, the Mach-Zehnder interferometer, the Sagnac interferometer or the Fabry-Pérot interferometer. All interferometers used in the method of this application may have in common that there are at least two beams. Furthermore, all interferometers used in the method of this application can have in common that there is at least one beam splitter which generates at least two beams from an input beam. The interferometer arms may be spatially separated or overlapped.

The intensity variations generated by interference of a plurality of fields are in particular called an interferogram. In particular, an interferogram can be an intensity pattern. The terms "holographic imaging" and "holography" can in this case and below refer to an interferometric technique which allows the amplitude and phase information of a wavefront to be stored, reconstructed and/or measured, and a hologram to be generated. In this case and below, a hologram is an acquisition, in particular a general acquisition, of a phase image. For example, a hologram is formed with one or more interferograms. Generating a hologram can require further physical steps and/or the processing of multiple interferograms. The generation of holograms can take place physically, for example by means of a photographic plate, or digitally, for example by means of digital storing of the interferogram and digital reconstructing. In the case of the so-called digital holography, the hologram is stored digitally. Furthermore, the term "holographic camera" can in this case and below refer to a device which is suitable for measuring the phase and/or the amplitude of an incident field, in particular of a light field.

In the case of conventional interferometers and holographic measuring systems or cameras, an undiffracted and/or unreflected, in particular external, reference ray is used. In the case of an external reference ray, the spatial conditions of the measuring set-up, for example of a beam source, the object and/or further measuring devices, must be suitable for providing the reference ray, since the measurement cannot be carried out otherwise.

It is an object of the invention to provide a method which allows determining a phase of an input beam without reference ray. A further object of the invention is to provide a method which allows interference between two unknown fields to be evaluated without a reference ray in such a way that the phase of at least one of the fields is determined in the process. This object is achieved by a method according to claim 1. The dependent claims define further embodiments of the invention.

A method for determining a phase of an input beam is provided. For example, it is possible to measure three-dimensional structures of an object by determining the phase. The three-dimensional structures may be surface structures and/or the three-dimensional shape of the object.

It is alternatively or additionally possible by determining the phase to generate a holographic image of an in particular three-dimensional object. For example, the method can be used to generate a hologram in a holographic camera. The method can be implemented physically and/or digitally. "Physical" may in this case and below refer to a method carried out by means of physical set-ups and measurements. "Digital" may in this case and below refer to a computational method and/or a method based on simulations. In a digital implementation, the method can be linear and/or purely analytical. In other words, the digital method may require only the in particular analytical solution of linear equations.

Hereinafter, a "field" may correspond to a beam. In this case and below, a "beam" can be described using an in particular electromagnetic vector field which propagates along a propagation direction. Alternatively, it is possible for the vector field to be a particle field, such as a neutron field. For example, a beam is a Gaussian beam. This beam has a two-dimensional cross section transversely, in particular orthogonally, to the beam. In this case and below, a z direction can be the propagation direction in space, while the cross section can be spanned by the x and y direction. A beam may be composed of rays, each ray describing in the mathematical sense the propagation of a point of the cross section along the direction of propagation. A beam can also be a digital beam, wherein corresponding physical properties of a physical beam can be achieved in the digital beam by simulations and/or calculations.

A beam may have an in particular complex amplitude, the square of the absolute value of which corresponds to an intensity. To the complex amplitude A, the following may apply: $A=|A|\cdot\exp(i\chi)$, where $|A|$ is the absolute value of the complex amplitude and $\chi$ is a phase. Below, unless explicitly stated otherwise, the term "amplitude" is understood to mean the absolute value of the complex amplitude. The complex amplitude may generally be a function of location. The complex amplitude, and thus the intensity and/or the phase, may vary along the beam, in particular along the cross section of the beam. It is also possible for the complex amplitude to vary along the propagation direction of the beam. In other words, at a fixed point along the propagation direction, the beam has, in cross section, a two-dimensional complex amplitude or a two-dimensional intensity and phase. It may be possible to calculate the complex amplitude for a further cross section when the complex amplitude of one cross section is known. For example, this can be done by solving the Helmholtz equation and/or using the Huygens, Rayleigh and Sommerfeld propagation theories. This method is called propagation. The mathematical representation of the propagation can take place by means of a propagator mapping.

For example, the vector field describing the beam may be split into an amplitude term and a phase term. Furthermore, a beam has at least one frequency which describes a temporal oscillation of the beam. The frequency may correspond to a wavelength of the rays of the beam. It is in particular possible for a beam to have a plurality of frequencies. For example, the beam is then a polychromatic field.

According to at least one embodiment of the method, an input beam having a phase is provided. The input beam comprises a plurality of input rays, each having a phase. In this case and below, the phase of the input beam may be the set of all phases of the input rays. Alternatively, the phase of the input beam may comprise only a portion of the phases of the input rays. The input beam may also have a central ray which can form an axis of symmetry of the input beam. For example, the input beam is an in particular electromagnetic vector field or the input beam can be described using a vector field. The input beam may be spatially coherent and/or quasi-coherent. It is possible for the input beam to contain or be formed of monochromatic or polychromatic laser light. Monochromatic laser light may have a single center frequency at which an intensity of the laser light is at a maximum. Polychromatic laser light may have a plurality of intensity maxima and/or intensity plateaus. For example, in order to provide the input beam, laser light may have been reflected on an object, with the reflected beam forming the input beam. The phase can then contain information about a three-dimensional structure of the object.

In this case and below, a "spatially coherent" field may have the property that, for two arbitrary points of an input surface, the field at a first time t can exhibit mutual interference and/or a mutual coherence or correlation with a field at a second time t'. For example, it is possible to measure this interference and/or coherence in an interferometer by varying the first time and the second time by overlapping the fields at the two times. The difference between the first time and the second time may correspond to different travel times of the field from the source to the interference point on the input surface.

An interferometer system is provided according to at least one embodiment of the method. The interferometer system comprises an optical system having a beam splitter and a beam combiner. The optical system can have further optical components, such as lenses, mirrors, diffractive, i.e. deflecting, optical elements (DOE) and/or retardation plates or consist of such an optical component. In a diffractive optical element, two beams can be brought together via different diffraction orders and/or modes. The beam splitter can in particular have a curved surface. The beam splitter and/or the beam combiner can be, for example, a 90/10 or a 50/50 beam splitter. The optical system is configured to provide a first interferometer arm and a second interferometer arm. The outputs of the beam splitter preferably correspond to one of the interferometer arms each. Each interferometer arm may comprise further optical elements. The two interferometer arms can overlap spatially.

The interferometer system further comprises a detection surface. The detection surface can be a part of a detector plane of a detector. In particular, the detection surface is the part of the detector plane which is involved in the method. The detector is preferably configured to measure the intensity of an incoming beam or an incoming field and convert it into a measurement signal, for example a voltage and/or a current. The intensity is preferably measured with spatial resolution. In other words, the detector may be configured to measure the intensity of a beam in two dimensions. This intensity pattern or intensity image is called interferogram. The detector or the detection surface can be a physical device for measuring and/or storing the measured images. For example, the detection surface or detector contains a photographic film and/or a holographic recording device. As a result, it may be possible to physically generate a hologram. In the case of the digital evaluation of the interferograms, the holograms can also be generated digitally.

Furthermore, the detector may be configured to measure the intensities in a spectrally resolved manner. The measurement signal can correspond to an in particular spectral Fourier transform of the interference beam. The detector or the detection surface is preferably designed such that edge regions of an incident beam are also measured.

The detection surface can have pixels with a pixel grid that can correspond to an indexing of the pixels. For example, the detection surface has horizontal pixels indexed by a first index and vertical pixels indexed by a second index. The detector may have a CCD sensor, a CMOS sensor, and/or an active-pixel sensor (APS). The detector preferably has two-dimensional arrangements or arrays of the sensors mentioned. The detection surface can in particular have pixels as measurement points.

According to at least one embodiment of the method, the method comprises splitting the input beam into a main beam and a reference beam using the beam splitter. The splitting takes place in such a way that each input ray is split into a main ray of the main beam and a comparative ray of the reference beam. In this case, a main ray and a comparative ray are unambiguously assigned to each input ray. Furthermore, an input ray can be unambiguously assigned to each main ray and each comparative ray. Each main ray and each comparative ray may respectively have one phase. The phase of each main ray and the phase of each comparative ray may correspond to the phase of the input ray assigned to the main ray and the comparative ray.

According to at least one embodiment of the method, the method comprises propagating the main beam along the first interferometer arm and the reference beam along the second interferometer arm. After propagation through the first interferometer arm and the second interferometer arm, the main beam and the reference beam are present as a propagated main beam and propagated reference beam. The propagation along the two interferometer arms may be different. For example, the propagated main beam or the propagated reference beam has a phase offset, rotation, amplitude reduction and/or general optical mapping, such as a collimation, in comparison to the main beam or the reference beam. This can be made possible by providing differently designed interferometer arms.

The first interferometer arm may comprise at least one first optical element. Furthermore, the second interferometer arm may have at least one second optical element. The at least one first and the at least one second optical element may be part of the optical system. An optical element is in this case and below a component of the optical system which causes a change in the main beam or the reference beam. It may be necessary for the optical elements to be designed such that the propagated main beam and the propagated reference beam are not identical and/or are not identical with the exception of a global phase.

The first interferometer arm may have a first optical path length and the second interferometer arm may have a second optical path length different from the first optical path length. An optical path length along one of the interferometer arms may in this case and below, in particular for the determination of a propagator mapping, be considered as an optical element. For example, at least one of the two interferometer arms has a Dove prism, at least one lens, a concave/convex mirror and/or a diffractive optical element. The optical elements may be combined with one another. For example, in some embodiments of the method, the two interferometer arms may have different lengths and different lenses and/or a different number of lenses.

According to at least one embodiment of the method, the method comprises superposing the propagated main beam and the propagated reference beam to form an interference beam. Superposing is carried out using the beam combiner. The beam combiner can be, for example, a prism, a partially reflecting mirror and/or a dichroic beam combiner. The beam combiner may have a curved surface, for example. Furthermore, the beam combiner can contain a diffractive optical element or be a diffractive optical element. The beam combiner can be configured such that the propagated main beam and the propagated reference beam interfere on a common surface, such as the detection surface, via an oblique incidence, which may be different from 90°.

The interference beam comprises a plurality of interference rays. An interference ray is an in particular point-by-point superposition of a main ray of the propagated main beam and a comparative ray of the propagated reference beam. In this case and below, a "superposition" of at least two rays may mean that the rays in a spatial area overlap, wherein the rays may have different propagation directions. Furthermore, a "point-by-point superposition" may in this case and below mean that the superposed rays interfere at a point, which can be the spatial area.

In a preferred embodiment, the propagation of the main beam along the first interferometer arm and of the reference beam along the second interferometer arm takes place such that at least a portion of the interference rays of the interference beam respectively is a superposition of a main ray of the propagated main beam assigned to a first input ray of the input beam and of a comparative ray of the propagated reference beam assigned to a second input ray of the input beam different from the first input ray. The propagation preferably takes place such that almost every, particularly preferably each, interference ray is in each case a superposition of a main ray of the propagated main beam assigned to a first input ray of the input beam, and of a comparative ray of the propagated reference beam assigned to a second input ray of the input beam different from the first input ray.

In this case and below, the term "almost every" may, in particular, mean that there are both rays having the property and rays not having the property. In particular, "almost every" means that at least 70%, preferably at least 80%, of the interference rays have the aforementioned property of respectively being a superposition of a main ray assigned to a first input ray and of a comparative ray assigned to a second input ray.

In particular, all interference rays can have the said property with the exception of a single interference ray. This single interference ray can be a central ray of the interference beam, which ray is in particular not generated from the input rays.

Propagation can thus take place in such a way that almost every interference ray is a superposition of two rays each of two different input rays. This may for example take place by a rotation and/or displacement of at least a portion of the reference beam in comparison to the main beam.

It is possible, in particular in the case where only a portion of the interference rays has the aforementioned property, that a further portion of the interference rays, preferably all other interference rays, of the interference beam is a superposition of a main ray of the propagated main beam assigned to a first input ray of the input beam, and of a comparative ray of the propagated reference beam assigned to a second input ray of the input beam identical to the first input ray. For example, almost every interference ray has the property of being a superposition of different input rays, and the remaining interference rays have the property of being a superposition of identical input rays.

Preferably, a main ray and a comparative ray are bijectively assigned to each interference ray. The main ray is assigned to a first, in particular any, input ray of the input beam. The comparative ray is assigned to a second input ray of the input beam which is in particular different from the first input ray. The interference beam may furthermore comprise a single central ray which is an in particular point-by-point superposition of a single central ray of the propagated main beam and a single central ray of the propagated reference beam, each assigned to a single central ray of the input beam. In other words, the central ray of the input beam, which is in particular not part of the input rays, is mappingd onto itself by means of the optical system.

In particular, the first input ray has a first phase, and the second input ray has a second phase. The main ray associated with the first input ray can also have the first phase. Furthermore, the comparative ray associated with the second input ray may have the second phase. The first phase may be different from the second phase. In other words, in the method described here, the input beam is first split into two beams (the main beam and the reference beam), wherein the two beams are subsequently superposed in such a way that different input beams with different phases interfere.

According to at least one embodiment of the method, a hologram is produced. For this purpose, the interference beam is propagated onto the detection surface. In other words, the detection surface is irradiated with the interference beam. In particular, an interference pattern is generated on the detection surface. By measuring the interference pattern, at least one interferogram may be generated or the interference pattern corresponds to at least one interferogram. The hologram is formed with the at least one interferogram.

According to at least one embodiment of the method, the method comprises determining a propagator mapping of the optical system. The propagator mapping describes a propagation of the propagated main beam into the propagatedreference beam. In other words, the propagator mapping corresponds to a backpropagation of the propagated main beam into a backpropagated main beam and then into a backpropagated input beam and a subsequent propagation of the backpropagated input beam into the reference beam and then into the propagated reference beam. The backpropagated main beam and the backpropagated input beam are preferably the main beam and the input beam. The propagator mapping describes in particular the change in the input beam by at least a portion of the optical system.

In particular, the propagator mapping may represent a bijective mapping, which may be approximately unitary. This property can be achieved, for example, by limiting the permissible input beams to those beams which pass through the interferometer without shadowing (so-called vignetting). Vignetting is in this case and below a lateral shadowing and/or blocking of a beam. Suitable optical systems in which significant vignetting is avoided are described, for example, in connection with the figures.

For example, the propagator mapping may be represented with a propagator matrix. The propagator mapping can be expressed in a simplified manner by the formula $E2=U \cdot E1$, where U is the propagator matrix, $E1$ is the propagated main beam, i. e. the field in the first interferometer arm, and $E2$ is the propagated reference beam, i. e. the field in the second interferometer arm.

The propagator matrix can be configured in particular to be invertible. An invertible matrix is in this case and below a matrix, the inverse matrix of which can be determined by analytical and/or numerical methods. For example, an element of the propagator matrix in the position space indicates how for a given pixel resolution of the detection surface, the main beam pixel of the detection surface with a first index u and a second index v is transformed into the reference beam at a pixel of the detection surface having the first index m and the second index n, wherein u and m as well as v and n have different values.

It is possible for the optical system to be provided and the propagator mapping to be determined in a plurality of cumulative steps. In particular, it may be necessary to provide the optical system in such a way that propagation through the optical system can be described with an invertible propagator matrix. For practical applicability, it may also be necessary for the propagator matrix to differ greatly from the unit matrix, since it is possible that a propagator matrix not sufficiently deviating from the unit matrix behaves like a unit matrix due to disturbances and finite quantization accuracies of the evaluation unit (e.g. 8 bits, 10 bits, 12 bits, 14 bits, 16 bits) or leads to an indeterminate problem in the solution.

In order to determine the propagator mapping, a solution of the Helmholtz equation and/or a diffraction propagator according to Huygens, Rayleigh or Sommerfeld can be used. Complex installations in the interferometer arms can be taken into account in the propagator mapping according to the methods of Fourier optics. For example, prisms, lenses or diffractive, i.e. deflecting, optical elements (DOE) can be described with the propagator mapping. Possibilities for determining the propagator mapping are described, for example, in the publications "Fourier Optics and Imaging" (chapter 9; Okan K. Ersoy, Wiley Interscience 2007) and "Introduction to Fourier Optics" (chapter 5; Joseph W. Goodman, McGraw Hill 1998, 2nd edition). A detailed description of the modeling of the propagator mapping follows later in this application.

One finding of the invention is inter alia that a propagator mapping can be provided which reduces the determination of the phases to a linear problem for the field of the main beam. A prerequisite for this is knowledge of the hologram and a method for reading out the hologram. Furthermore, the amplitudes of the main beam and of the reference beam can be known from independent measurements. The relationship between the main beam and the reference beam is described by the propagator mapping, which is a property of the interferometer. The two ray fields coming into interference, that is to say the main beam and the reference beam, are thus not independent of one another.

According to at least one embodiment of the method, the method comprises providing a test beam. The test beam can be a physical beam, for example a Gaussian beam. It is alternatively or additionally possible for the test beam to be formed at least partially digitally. The test beam is preferably configured completely digital. For example, the test beam then is at least a portion of a solution of a system of equations. The test beam has a test phase. The test phase is preferably known. The method further comprises reading out the hologram with at least a portion of the test beam to generate a first beam, and applying the propagation mapping to at least a portion of the test beam to generate a second beam. The respective portion of the test beam can, for example, be provided by splitting the test beam into a first and a second portion by means of a beam splitter. The propagation mapping may be applied physically. The propagation mapping is preferably applied digitally, that is to say by calculations and/or simulations. In this case and below, "reading out a hologram" means that a new beam, in the present case the first beam, is generated from a given beam by physical and/or digital scattering on the hologram. It is preferably possible to generate the reference beam by reading out with the test beam from the main beam.

The reading out method can be closely related to the generation of the hologram. For example, the hologram may be generated as an intensity image of an interferogram. In this case, the hologram can contain all terms of an intensity field of the interference beam. In this case, it may be necessary for the reading out to be suitable for suppressing unwanted physical ghost images. Ghost images of this type, which are also referred to by the term "twin problem", can be double images, usually undesired, in holography applications. The reading out can also be a digital process, for example if the hologram is generated digitally.

According to at least one embodiment of the method, the propagation of the main beam along the first interferometer arm and of the reference beam along the second interferometer arm (corresponding to step d)) takes place in such a way that an interference ray, in particular precisely one interference ray, of the interference beam is a superposition of a main ray of the propagated main beam assigned to a first input ray of the input beam and a comparative ray of the propagated reference beam assigned to a second input ray of the input beam identical to the first input ray. An interference ray, in particular precisely one interference ray, is thus a superposition of two rays which are assigned to an identical input ray. This ray is in particular the central ray of the interference beam. The other interference rays can all be a superposition of two rays which are assigned to different input rays.

According to at least one embodiment of the method, the method comprises a comparison of the first beam and the second beam. In particular, the phases of the two beams are compared. The provision of the in particular arbitrary test beam, the generation of the first and the second beam, and the comparison between the first and the second beam are repeated until the first beam and the second beam are substantially identical with the exception of local intensity differences and/or a global phase. The global phase is preferably a location-independent variable. In other words, the steps are repeated until an evaluation or a reading of the hologram with the test beam having a phase leads to the same result as the propagation of the test beam by means of the propagator mapping.

Repeating the steps may correspond to analytically and/or numerically solving an eigenvalue equation. "Substantially identical" in this case means that differences between the two beams are possible within the limits of the manufacturing tolerances, for example by slight deviations in the beam propagation and/or inaccuracies in a calculation. The identity of the two beams is thus not to be understood in the mathematically strict sense. The local intensity differences preferably correspond to the intensity of the main beam and/or of the reference beam. If the comparison shows that the two beams are identical with the exception of intensity differences and a location-independent global phase, the phase of the test beam is equal within the limits of the measurement accuracy to the phase of the main beam and/or of the reference beam on the detection surface. The global phase corresponds to the phase-matching factor. The phase equality of the test beam to the main beam or to the reference beam can apply except for an arbitrary location-independent constant.

The test beam can thus be varied, with the objective of finding a test beam as solution beam which has the phase of the main beam and/or of the reference beam or of the input beam. Providing the test beam, generating the first and the second beam and comparing the two beams may at least partially be carried out using an evaluation unit. The evaluation unit can comprise a memory unit and a processor unit. For example, the evaluation unit includes a computer or is a computer. It is possible for the test beam to be generated and propagated in the evaluation unit. Alternatively or additionally, the evaluation unit can contain a physical system for generating the in particular physical test beam as well as optical components. The propagator mapping can be stored in the evaluation unit and/or be realized with optical components.

According to at least one embodiment of the method, the method comprises determining at least a portion of the phases of the input beam or at least a portion of the phases of the input rays from the test phase of the test beam. The determination may contain a comparison between the result of propagation of the test beam and the reading out of the hologram by means of the test beam. For example, the phase of the input beam corresponds to the test phase.

According to at least one embodiment, the method is free from the use of a reference ray. In this case and below, a reference ray is a ray having a fixed phase relationship. For example, while the output ray is reflected and/or diffracted on an object, a reference ray is not reflected and/or diffracted on an object and thus, like the input rays, has no variable phase. Rather, in the present method, different input rays of the input beam are superposed with one another in order to determine the phases of the input rays. The superposed rays are therefore in a relationship because they originate from the same input beam upstream of the beam splitter.

It is also possible that further beams are used in the method. In particular, more than two beams can be superposed to form the interference beam when using further beam splitters and/or a multi-pass beam splitter. Interferometer systems in which more than two beams are used can thus also be used in conjunction with the method. Due to the linearity of the field equations, several beams may, for example, be combined for this purpose to in particular two groups, wherein the method is applied to the respective groups.

According to at least one embodiment of the method, the method comprises the steps of:

a) Providing an input beam having a plurality of input rays, each having a phase;

b) Providing an interferometer system comprising a detection surface and an optical system for providing a first interferometer arm and a second interferometer arm, comprising at least one beam splitter and one beam combiner;

c) Splitting the input beam into a main beam and a reference beam using the beam splitter such that each input ray is split into a main ray of the main beam and a comparative ray of the reference beam, a main ray and a comparative ray being unambiguously assigned to each input ray;

d) Propagating the main beam along the first interferometer and the reference beam along the second interferometer arm;

e) Superposing the propagated main beam and the propagated reference beam to form an interference beam having a plurality of interference rays using the beam combiner;

f) Generating a hologram by propagating the interference beam on the detection surface and measuring at least one interference pattern of the interference beam;

g) Determining a propagator mapping of the optical system, wherein the propagator mapping describes a propagation of the propagated main beam into the propagated reference beam;

h) Providing a test beam with a test phase;

i) Reading out the hologram with at least a portion of the test beam to generate a first beam and applying the propagation mapping to at least a portion of the test beam to produce a second beam;

j) Comparing the first beam and the second beam; and k) Determining at least a portion of the phase of the input beam from the test phase of the test beam, wherein the steps h) to j) are repeated until the first beam and the second beam are substantially identical with the exception of local intensity differences and/or a global phase, the propagation in step d) takes place such that at least a portion of the interference rays of the interference beam is a superposition of a main ray of the propagated main beam assigned to a first input ray of the input beam, and of a comparative ray of the propagated reference beam assigned to a second input ray of the input beam different from the first input ray, and the method is free from the use of a reference ray.

The method steps may be performed in any order.

According to at least one embodiment of the method, the test beam is arbitrarily selectable from a set of beams when these beams are propagated to a first beam by applying the propagation mapping. In other words, the test beam is designed such that the propagation mapping can transform the test beam into another beam.

According to at least one embodiment of the method, the first interferometer arm and/or the second interferometer arm of the optical system comprise a beam rotation element. The beam rotation element can be, for example, a Dove prism, a lens system and/or a retardation plate, or the beam rotation element can comprise at least one of these components. Propagating the main beam along the first interferometer arm furthermore comprises rotating the main beam around an axis of rotation extending along the propagation direction using the beam rotation element. Alternatively or additionally, propagating the reference beam along the second interferometer arm comprises rotating the reference beam around an axis of rotation extending along the propagation direction using the beam rotation element. The rotation takes place with a rotational angle. The rotational angle is preferably at least 170° and at most 190°, preferably at least 175° and at most 185°, and particularly preferably 180°. The field upstream of the beam rotation element, $E_{ein}(x,y,z,t)$, can then be transformed, for example, into a rotated field $E_{dreh}=E_{ein}(-x,-y,z,t)$. The central ray of the input beam can in this case be mappingd onto itself.

It is possible for the rotation to cause a relative rotation of a polarization of the main beam and/or of the reference beam. This rotation of the polarization can be taken into account by a correct vectorial consideration of the vector field of the main beam. In particular, it is possible to compensate rotation of the polarization by means of further optical elements, for example small retardation plates.

According to at least one embodiment of the method, the first interferometer arm and/or the second interferometer arm of the optical system comprise at least one lens. The lens can cause a rotation of the main beam or of the reference beam, for example by a rotational angle of 180°, about an axis of rotation extending along the propagation direction and/or along an optical axis of the at least one lens. Propagating the main beam or the reference beam along the first interferometer arm or along the second interferometer arm comprises focusing and/or defocussing the main beam and/or or the reference beam using the at least one lens.

According to at least one embodiment of the method, determining the propagator mapping includes the further steps of determining a first propagator mapping and determining a second propagator mapping. The first propagator mapping describes a propagation of the input beam through the beam splitter and along the first interferometer arm. The second propagator mapping describes a propagation of the input beam through the beam splitter and along the second interferometer arm. Furthermore, the first propagator mapping is inverted, for example by means of analytical and/or numerical methods. The product of the inverse of the first propagator mapping with the second propagator mapping serves to determine the propagator mapping.

Propagation by means of the first and the second propagator mapping can be expressed in a simplified manner using the formulae $E2=U1 \cdot E_{in}$, and $E2=U2 \cdot E_{in}a$, where U1 is a first propagator matrix describing the first propagator mapping, U2 is a second propagator matrix describing the second propagator mapping, and $E_{in}$ is the input beam, i.e. the field upstream of the beam splitter. A detailed description and determination of the first and second propagator mappings follows later in this application. It is possible for the propagator mapping to be provided by a multiplication of the second propagator mapping with the inverse of the first propagator mapping, i.e. $U=U2 \cdot U1^{-1}$, or vice versa. In this case, it can be utilized in particular that the input beam, the main beam and/or the reference beam have no vignetting. This makes it possible that the two mappings by the first and second propagator mapping can be combined such that the field of the reference beam on the detection surface can be calculated from the field of the main beam on the detection surface.

According to at least one embodiment of the method, the interferometer system further comprises a beam source. The beam source is configured to emit an initial beam having a plurality of initial rays and propagating along a propagation direction. The initial beam may be an in particular electromagnetic vector field. The initial beam can then be formed as a Gaussian beam. Furthermore, the initial beam may be an in particular collimated light beam. The initial beam is preferably configured to be coherent.

According to at least one embodiment of the method, an object having an outer surface is provided. The object is preferably positioned with respect to the interferometer system such that the optical system is arranged downstream of the object in the propagation direction. Furthermore, the object is arranged downstream of the beam source in the propagation direction.

According to at least one embodiment of the method, at least a portion of the object is irradiated with the initial beam. The irradiation takes place in such a way that at least a portion of the initial rays of the initial beam are reflected at object points. The object points are part of the outer surface of the object. By means of the reflection, the portion of the initial rays is transformed into the plurality of input rays of the input beam. The phase of each input ray corresponds to a phase shift with respect to an initial ray of the at least a portion of the initial rays assigned unambiguously, in particular bijectively, to the input ray. In other words, the phase is preferably a phase shift of the input ray to the initial ray assigned to it. The phase of each input ray contains in particular information about the three-dimensional structure of the object.

According to at least one embodiment of the method, the detection surface is configured to store the hologram. Alternatively or additionally, it is possible for the detection surface to be configured to store the interferogram of the interference pattern. The hologram may be generated from one or more interferograms. The stored hologram can be a holographic image of the object. The detector is preferably a digital detector whose digital measurement signal is stored in a memory unit. A digital hologram can be generated by processing the digital measurement signals.

Alternatively or additionally, the detection surface can be part of a photographic plate and/or a holographic recording device. A physical hologram can be generated from such a device, with the special feature that a reading out of the hologram without the reference ray is possible with the method described here. The method then further comprises reading out that includes diffracting the reference beam or the main beam on the interference pattern to reconstruct the holographic image of the object. The reading out can be performed physically or digitally, depending on whether the hologram is physically or digitally present. Local intensity effects and/or global phase effects are not considered in this case. The reference beam or the main beam can thus assume the function of a reference ray in a holography application.

The reading out of the hologram with the main beam or with the reference beam can lead to the reference beam or the main beam, wherein additional ghost images can be generated. To the extent that the hologram is generated and/or read digitally, the ghost images can be suppressed digitally, in particular by digital filters. If the hologram is generated and/or read physically, for example by irradiating a photographic plate, it may be necessary to suppress the ghost images by means of masking or filtering.

According to at least one embodiment of the method, determining the phase from the interference pattern includes at least one, preferably all, of the following further steps:

h1) Selecting a frequency which is part of the spectrum of the main beam and determining the interference pattern at this frequency;

h2) Determining the intensity and/or amplitude of the propagated main beam and/or determining the intensity and/or amplitude of the propagated reference beam on the detection surface;

h3) Determining a complex interference term of the interference pattern;

h4) Determining a complex phase-matching factor which takes into account possible scales and total phase differences between the determination of the propagator mapping and the complex interference term.

The interferograms can then be evaluated in particular digitally. The complex interference term may then correspond to the digital interferogram and/or the digital hologram.

Re: step h1): It is possible for a center frequency of the input beam to be used as the frequency. The selection of the center frequency lends itself, for instance, if the input beam is an in particular temporally and spatially, (quasi-)coherent field and the coherence length of the input beam is longer than the path differences in the first and/or second interferometer arm. The center frequency can then be the frequency of the spectrum of the input beam, at which the input beam has an intensity maximum, in particular a single intensity maximum. Furthermore, it is possible that a sufficient frequency selection is already achieved by a filter installed in the beam path of at least one of the beams, such as an interference filter, a dielectric filter, an etalon and/or a Fabry-Pérot filter. The input beam may then be regarded as quasi-coherent.

Re: step h2): It is possible that determining the intensity and/or amplitude of the propagated main beam comprises blocking the reference beam or propagated reference beam by means of further optical elements. The alternative or additional determination of the intensity and/or amplitude of the propagated reference beam may furthermore comprise blocking the main beam or propagated main beam by means of further optical elements.

Re: step h3): Step h3) may be required in particular in the case of a digital hologram. Evaluating the hologram or determining the phase of the input beam can then take place digitally, i.e. for example using a digital evaluation unit. In particular, the evaluation of a digital hologram can take place by determining the complex, in particular local, interference term. Below, the terms "complex interference term," "local interference term" and "interference term" are used synonymously. Preferably, the determination of the complex interference term is equivalent to the digital generation of a hologram. The reading can correspond to a point-by-point multiplication of the complex interference term with the in particular complex amplitude of the main beam and/or of the reference beam.

The complex interference term (IF) is preferably the product of the absolute value of the amplitude of the propagated main beam (E1), the absolute value of the propagated reference beam (E2) and a phase factor ψ:

$$IF = |E1| \cdot |E2| \cdot \exp(i \cdot \Psi),$$

where the phase factor ψ is the difference between the phase of the propagated main beam and the phase of the propagated reference beam. For example, the complex interference term can be determined via the so-called carrier phase method.

The complex interference term IF can be determined, for example, using a phase shifting method, a carrier phase method and/or a spatial phase shifting method. These methods are described, for example, in the publication "Handbook of optical Metrology" (chapter 8 and chapter 8.5.1; edited by Toru Yoshizawa and Francis Group, CRC Press Taylor, 2nd edition). The phase shifting method may, for example, enable a parallel determination of the complex interference term (step h3) and the amplitude and/or intensity of the propagated main beam or the propagated reference beam (step h2). Furthermore, the carrier phase method can enable a determination of the complex interference term with a single shot or measurement (so-called single shot method). Both the phase shifting method and the carrier phase method allow a determination of the intensity of the propagated main beam or of the propagated reference beam.

Re: step h4): By suitable selection of the phase-matching factor, normalization can be taken into account. It is possible to reduce the determination of the phase-matching factor to a problem in phase matching. Such a problem can occur, for example, if the path lengths of the interferometer arms are not known ad hoc with the required accuracy of fractions of a wavelength. The problem can basically be solved via a calibration using a sufficiently known calibration beam. For example, a known phase, which is for example known from a calibration measurement and/or an interference reconstruction, can be reconstructed for this purpose using the method described here. The phase-matching factor can be varied until the quality of reconstruction is satisfactory, similarly to an electronic focusing method. Alternatively or additionally, a single value analysis (below also SVD analysis; SVD stands for singular value decomposition) of the method can be carried out.

According to at least one embodiment of the method, the determination of the intensity and/or amplitude of the propagated main beam and/or the propagated reference beam (step h2) and the determination of the complex interference term (step h3) take place with a common determination method. The phase shifting method and/or the carrier phase method are preferably suitable for this purpose. For this purpose, it may be necessary to select the frequency (step h1) beforehand.

An advantage of determining the phase of the input beam using the propagator mapping of the optical system is the possibility of being able to use different optical set-ups and/or optical systems for phase analysis. The optical system can be selected such that the propagator mapping is adapted to the requirements of the problem.

Another advantage is that interferometer systems with different interferometer arms, in particular different arm lengths, which have different optical elements can be analyzed and evaluated. Significant approximations are not required for this purpose. A pronounced asymmetry between the two propagation paths or the two interferometer arms may facilitate determining the phase. With a suitable design of the optical system, there is therefore the possibility of measuring the spatial phase by means of a single measurement on a detector (so-called single shot system). If this property is combined with a phase determination of the complex interference term, a system for phase determination of a local phase on a surface in the single shot method can be provided without an external reference ray.

The method is based in particular on the ideas described below. The mathematical models explained below for describing the method are given merely for an understanding of the invention. In particular, the mathematical models are not to be considered as limiting a general implementation of the method. If one of the models and/or one of the following mathematical formulae is incomplete or even partially erroneous, the initially described embodiments of the method continue to be applicable.

An input beam that enters through an input plane of the optical system, which may be, for example, an aperture of the optical system, and that is described by a vector field $E_{in,s}(x,y,z,t)$ is split into two fields, in the present case the main beam and the reference beam, and propagated along two interferometer arms. Here, s is an index of the vector of the field, for example the polarization, x, y, z are the spatial coordinates and t is the time. If the field is described in the so-called scalar approximation and/or if the field is described as an unpolarized field, the index s takes on only one value (s=1) and can be suppressed in the formulae. The propagated main beam, i.e. the first field E1 in the first interferometer arm, and the propagated reference beam, i.e. the second field E2 in the second interferometer arm, interfere on the detection surface. The measured interference is thus a function of the fields E1 and E2.

According to the Fourier analysis, fields E, in particular the fields $E_{in}$, E1 and E2, can be represented as a sum via field components of different frequency $\omega_i$ ($\omega_i > 0$), where i is an index:

$$E_s(x,y,z,t) = \Sigma_{\omega_i} \hat{E}_s(x,y,z,\omega_i) e^{j\omega_i t}$$

(cf. also Born/Wolf, Principles of Optics, chapter 10.2; Cambridge University Press, 7th edition). The functions $\hat{E}_s(x,y,z,\omega_i)$ occurring in the sum are the local expansion coefficients of the Fourier expansion of $\omega_i$ and are complex functions. They can be represented as:

$$\hat{E}_s(x,y,z,\omega_i) = |\hat{E}_s(x,y,z,\omega_i)| e^{j\Phi_s(x,y,z,\omega_i)}.$$

The spectral distribution of the intensity in the area of the interference between E1 and E2, that is to say the in particular digital interferogram determined with the detection surface, is referred to hereinafter as $\hat{I}_{IF,s}(x,y,z,\omega_i)$. The following this applies:

$$\hat{I}_{IF,s}(x,y,z,\omega_i) = |\hat{E}1_s(x,y,z,\omega_i) + \hat{E}2_s(x,y,z,\omega_i)|^2 = = |\hat{E}1_s|^2 + |\hat{E}2_s|^2 + \hat{E}1_s \hat{E}2_s + \hat{E}2_s \hat{E}1_s, \quad (1)$$

wherein the indices were omitted for clarity in the second part of the equation. It is in particular assumed in this case that the hologram is exclusively generated as an intensity image of the interferogram. In other words, the hologram contains all the terms of the intensity field $\hat{I}_{IF,s}(x,y,z,\omega_i)$. The interferogram measured in an in particular spectrally resolved manner is thus composed of the respective interferences of the propagated main beam and of the propagated reference beam and mixed terms of the amplitudes of the two beams. The last term of equation (1) can be represented as so-called complex local interference term IF as follows:

$$IF_s(x,y,z,\omega_i)=|\hat{E}2_s(x,y,z,\omega_i)||\hat{E}1_s(x,y,z,\omega_i)|\exp[j\Psi_s(x,y,z,\omega_i)] \quad (2)$$

The interference term can in particular be the digital hologram. Here, $\psi_s(x,y,z,\omega_i):=\phi1_s(x,y,z,\omega_i)-\phi2_s(x,y,z,\omega_i)$, where $\phi1$ is the phase of the main ray and $\phi2$ is the phase of the comparative ray. The phase of the main ray corresponds to a phase of the first input ray, and the phase of the comparative ray corresponds to a phase of the second input ray. The local interference term is thus composed of interferences from different phases of the input rays.

If the propagated reference beam E2 in the formula (1) or (2) is replaced by a function U(E1) dependent only on the propagated main beam, the interference image $I_{IF,s}$ becomes a function of only E1. Using the knowledge of the set-up of the interferometer and using linear, in particular electromagnetic, field equations, such as the solution of the Helmholtz equation or the propagation theories according to Huygens, Raleigh and Sommerfeld, the phase of the field at a different location, in particular at a location before or in the interferometer, can be calculated from one of the interfering fields by means of the field propagation methods. In particular, under certain conditions, the second field E2 on the detection surface can be calculated from the first field E1 on the detection surface (via the so-called propagator mapping U). The propagation is linear, i.e. the field on the detection surface is a linear function U of the field. This will be explained in more detail below.

According to formula (2), the complex phase $\psi$ of IF is a defined function of the location. It is possible to measure the complex phase of an interference term by means of known methods, such as phase shifting methods or carrier phase methods. The amplitudes |E1|, |E2| and/or the complex phase $\psi$ of the local interference term can thus be known, for example from a preceding measurement, for points on the detection surface and for the respectively used frequency of the input beam. The complex phase $\psi=\phi1-\phi2$ specifies the difference in the phases of the main beam and the reference beam, but without offering a direct way for a resolution of the individual contributions of $\phi1$ and $\phi2$.

In some measurement situations, it is possible that the amplitudes and the absolute value of the interference term are known only in scaled units, i.e. on a scale which can differ for each frequency $\omega_i$ between $|E1|^2$ and $|IF|$ by a location-independent but fixed phase-matching factor $f(\omega)$, so that $$f_s(\omega_i)IF_s(x,y,z,\omega_i)=|\hat{E}2_s(x,y,z,\omega_i)||\hat{E}1_s(x,y,z,\omega_i)|e^{j(\Phi1s(x,y,z,\omega_i)-\Phi2s(x,y,z,\omega_i))} \quad (3).$$

The phase-matching factor may be incorporated into the parameters in the determination of the propagator mapping and of the complex interference term. This makes it possible for the phase-matching factor not to occur explicitly in mathematical models. In the following representation, the phase-matching factor is explicitly shown as far as possible. The phase-matching factor is also called the "location-independent phase factor" at another point in the application.

Furthermore, the propagation of the propagated main beam E1 into the propagated reference beam E2 is known by means of the propagator mapping U from the set-up of the interferometer. This propagation can be defined mathematically as follows:

$$\hat{E}2_t(x_{uv},y_{uv},z_{uv},\omega_i) = \sum_{s,m,n} U_{ts}(x_{uv},y_{uv},z_{uv},x_{mn},y_{mn},z_{mn},\omega)\hat{E}1_s(x_{mn},y_{mn},z_{mn},\omega_i) \quad (4)$$

In this case, u, v and m, n are suitable indices of the detection surface with m=1 ... M, n=1 ... N, u=1 ... U, v=1 ... V, where M, N, U, V are natural numbers. $x_{mn}$, $y_{mn}$, $z_{mn}$, $x_{uv}$, $y_{uv}$, $z_{uv}$ are points on the detection surface. Preferably the same resolution is used for u, v and m, n. The indices s and t correspond to the polarization.

Below, the index i is suppressed for the frequencies $\omega_i$; where the frequency $\omega$ is a frequency from the set of frequencies occurring in the frequency spectrum IF. Furthermore, the following abbreviations are introduced:

$$\hat{E}_s(x_{mn},y_{mn},z_{mn},\omega)=\hat{E}_{s,m,n,\omega}=|\hat{E}_{s,m,n,\omega}|\exp(j\Phi_{s,m,n,\omega}),$$
$$\text{and } IF_s(x_{mn},y_{mn},z_{mn},\omega)=IF_{s,m,n,\omega}.$$

Taking into account the propagator mapping (formula (3)) and the phase-matching factor leads to the following equation for the local interference term:

$$f_t(\omega)IF_{t,m,n,\omega} = \sum_{s,u,v} \overline{U_{t,m,n,s,u,v,\omega}E1_{s,u,v,\omega}}E1_{t,m,n,\omega} \quad (5)$$

(for all, $t$, $m$, $n$ in the index range).

Multiplying the complex conjugate of equation (5) with the field E1 describing the main beam results in the following transformation to a conditional equation:

$$\overline{f_t(\omega)IF_{t,m,n,\omega}}\hat{E}1_{t,m,n,\omega} = |\hat{E}1_{t,m,n,\omega}|^2 \sum_{s,u,v} U_{t,m,n,s,u,v,\omega}\hat{E}1_{s,u,v,\omega} \quad (6)$$

Here, the amplitude of the main beam, |E1|, the intensity of the main beam, $|E1|^2$, the complex conjugate of the local interference term IF and the propagator mapping U are known from independent measurements. The factor $f(\omega)$ is a phase factor, in particular any phase factor. Thus, the equation can be solved for each frequency $\omega$ independently of the complex amplitude |E1|.

Consequently, the determination of the phase of the input beam includes the solution of the linear equation of the conditional equation (6) for all m, n in the predefined detection surface. With prior knowledge of the amplitude of the main beam, the method thus defines a class of conditional equations that are linear in the field of the main beam E1. The solution of the equation for $\hat{E}1$, which also contains the phase, in the local base or an otherwise chosen base results in a reconstructed field, rec$\hat{E}1$.

As far as the rank of the conditional equation (6) is not sufficient for a unambiguous determination of the solution, the method can comprise adding further conditional equations to the system of equations. The rank of the equation can also be increased by an increased asymmetry between the first interferometer arm and the second interferometer arm. For example, this can be achieved by inserting a lens, in particular an additional lens, into one of the two interferometer arms, by using a lens with a higher refractive power, by adjusting the rotation between the two interferometer arms, and/or by adding further optical components into the interferometer arms. Alternatively or additionally, the rank can be increased by a combination of different measurements. In order to solve the equation in the context of the method described here, it is in particular possible for a solution vector to be sought, in particular numerically, which minimizes the error (hereinafter also: "remainder") in the solution of the homogeneous equation. Such a method is particularly suitable in cases where the solution of the conditional equation can no longer be exact due to interfering influences, for example noise in the measurement data, quantization errors in the detector, detector noise, inaccuracies in the phase-matching factor and/or errors in the determination of the propagator mapping.

Alternatively, the right side eigenvector can be determined to the lowest s value of an SVD decomposition. In particular, the system of equations of the conditional equation (6) to be solved can be defined in a matrix equation $M \cdot E = 0$, where E is the field sought. The procedure according to the SVD decomposition is thus equivalent to the solution of the associated eigenvalue problem $\overline{M}^t M E = e_0 E$ to the lowest eigenvalue $e_0$. The matrix $\overline{M}^t M$ may be a self-adjoint and in particular Hermitian matrix. In other words, the problem of phase determination can be reduced to the problem of eigenvector determination to the lowest eigenvalue of a real symmetric matrix by appropriate selection of the interferometer system and in particular of the optical system contained therein. Stable and fast numerical solution methods exist for this class of matrices.

From the reconstructed field, the phase $\phi 1$ (modulo $2\pi$) can now be determined, for example with the following equation:

$$\Phi 1_s(x_{mn}, y_{mn}, z_{mn}, \omega) = \text{In}(\ln(\text{rec}\hat{E} 1_{s,m,n,\omega}))$$

An arbitrary function base can be selected for the solution of the conditional equation (6). For example, a plane wave base (i.e. a Fourier base), a wavelet base or a base with Zernike functions is suitable. By selecting a suitable base, the computation of the propagator mapping U can be simplified. For example, in Fourier space, the Rayleigh-Sommerfeld propagator of the free space is diagonal.

The determination of the phase has an indeterminacy with respect to the addition or subtraction of integer multiples of $2\pi$. The detection surface can be indexed in such a way that the functions E1, E2, IF under consideration satisfy the Shannon-Nyquist sampling theorem. For this purpose, in the case of equidistant pixels of the detection surface, it may be necessary to form the detection surface such that the phase variation from one indexed pixel to the next is at most $+/-\pi$. For example, phase unwrapping technology may be required for this purpose.

To the extent that different interferences, for example in the case of variable interferometer systems, are to be evaluated jointly via the conditional equation (6), it may be necessary to determine the propagation matrix and the phase-matching factor for each of the interferences. The system of equations can then contain further equations, for example assuming that the main beam does not change its position relative to the indexing of the detection surface. In the case of a change in the position, it may be necessary to adapt the indexings between different interferometer configuration to one another. This is not a fundamental problem. In the most general case, this can be solved via image transformation methods, for example by means of the projective or affine transformation of images.

In addition to the aforementioned methods of calibration and/or SVD analysis, for example an SVD analysis of the conditional equation, the phase-matching factor can be determined and/or recalibrated using the two further methods described below on the basis of the data of the hologram or interferogram. These two methods can also be helpful as a preliminary stage of the method for determining the phase described here.

The first method is in particular suitable for determining the absolute value of the phase-matching factor. A unitary propagator mapping is assumed for this purpose, so that E1 and E2 have the same absolute square in the (simplified) formula $E2 = U \cdot E1$. The amplitude of the phase-matching factor is thus obtained by converting the equation (3) for all polarizations t:

$$|f_t(\omega)| = \|E1_{t,m,n,\omega}\| / \left\| \frac{IF_{t,m,n,\omega}}{E1_{t,m,n,\omega}} \right\|. \tag{7}$$

Here, $\|A\|$ stands for a norm of matrix A, wherein A corresponds to E1, IF and/or E1.

The second method is especially suitable in particular for determining an imaginary part, corresponding to a phase, of the phase-matching factor. It is assumed here that for the mapping $E2 = U \, E1$, there is approximately a point $x_f, y_f, z_f$ on the detection surface for which, independently of the actually present field of the main beam E1 or of the reference beam E2, the following respectively applies to any polarization t:

$$\hat{E}2_t(x_f, y_f, z_f, \omega) = \hat{E}1_t(x_f, y_f, z_f, \omega)$$

Such a point $x_f, y_f, z_f$ of the mapping U can be a fixed point for E1 and E2. The following thus applies to the fixed point (cf. equation (3)):

$$f_t(\omega) \underline{IF_t(x_f, y_f, z_f, \omega)} = \hat{E}2(x_f, y_f, z_f, \omega)\hat{E}1(x_f, y_f, z_f, \omega) = |\hat{E}1(x_f, y_f, z_f, \omega)|^2$$

The following thus applies:

$$\ln(\ln(f_t(\omega))) = -\ln(\ln(IF_t(x_f, y_f, z_f, \omega)))$$

According to one embodiment of the method, the propagator mapping U is determined from the first propagator mapping U1 of the first interferometer arm and the second propagator mapping U2 of the second interferometer arm. The determination can take place as follows. The first propagator mapping describes the propagation of the input beam along the first interferometer arm and the second propagator mapping describes the propagation of the input beam along the second interferometer arm.

The propagations along the two interferometer arms are respectively carried out starting from the same plane, wherein the beam splitter is initially not taken into account for the determination of the formulae. Expressed in formulae:

$$\hat{E}1_t(x, y, z, \omega_i) = \tag{6}$$
$$\sum_{s,g,h} U1_{t_s}(x, y, z, x_{gh}, y_{gh}, z_{gh}, \omega_i) \hat{E}_{in,s}(x_{gh}, y_{gh}, z_{gh}, \omega_i)$$

$$\hat{E}2_t(x, y, z, \omega_i) =$$
$$\sum_{s,g,h} U2_{t_s}(x, y, z, x_{gh}, y_{gh}, z_{gh}, \omega_i) \hat{E}_{in,s}(x_{gh}, y_{gh}, z_{gh}, \omega_i)$$

Here, g, h is any indexing of the input plane with g=1 ... G, h=1 ... H, where G and H are natural numbers. $x_{gh}$, $y_{gh}$, $z_{gh}$ are points on the input plane, and x, y, z are points on the detection surface.

In order to determine the propagator mapping from the first and the second propagator mapping, the fields $E_{in}$, E1, E2 of the interferometer can be limited to fields for which there is no substantial vignetting. For this purpose, for example, the indexing of the pixels on the detection surface is selected such that only regions of the fields without substantial vignetting are included. In the case without substantial vignetting, the propagator mapping U can result from the mapping $U2 \cdot U1^{-1}$, i.e. from the multiplication of the second propagator mapping with the inverse of the first propagator mapping.

The method described here is explained in more detail below with reference to exemplary embodiments and the associated figures.

FIGS. 1a, 1b, 1c, 1d, 1e and 2 show exemplary embodiments of a method described here with reference to schematic representations.

Identical, similar or identically acting elements are provided with the same reference signs in the figures. The figures and the size relationships of the elements illustrated in the figures to each other are not to be considered as true to scale. Rather, individual elements may be shown exaggeratedly large for better presentability and/or for better understanding.

Figure 1C:
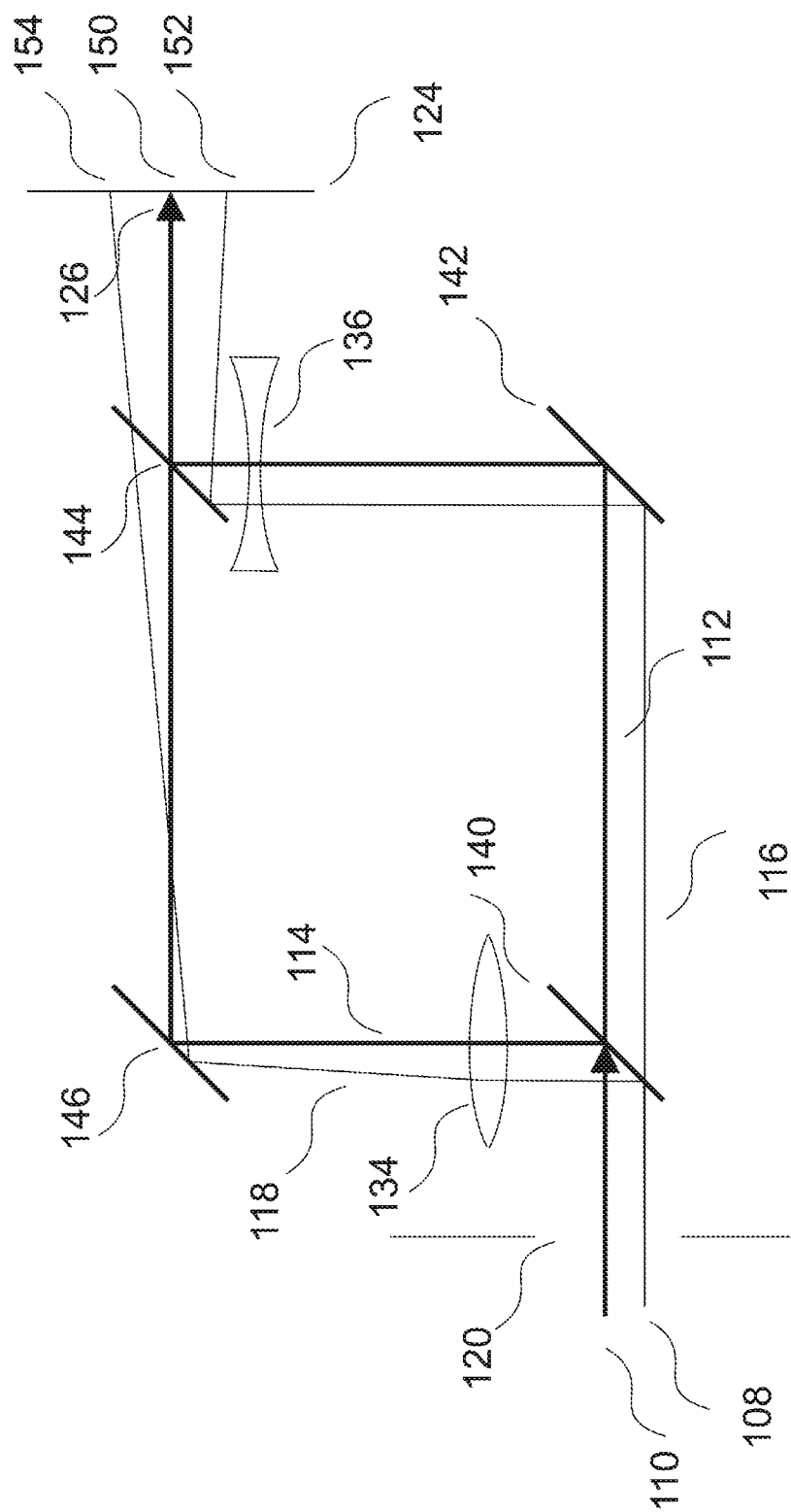
Figure 1E:
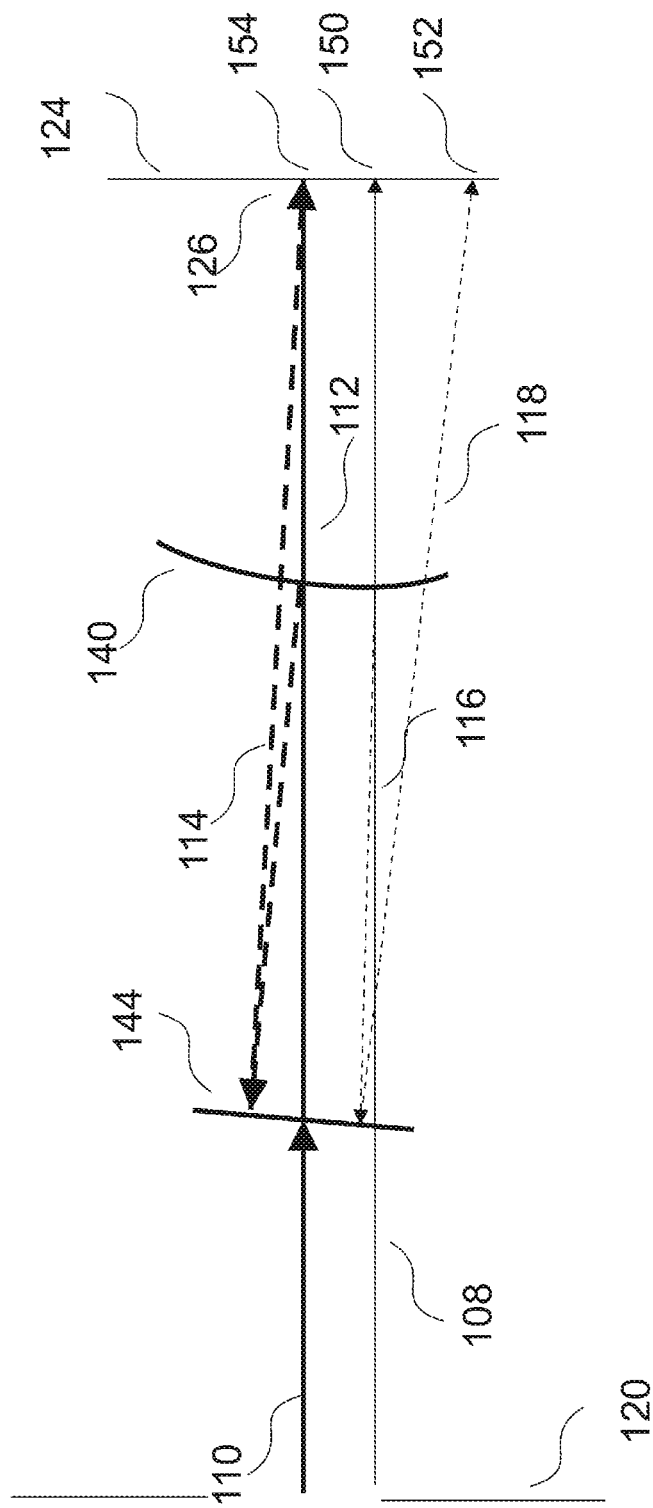

On the basis of the schematic representations of FIGS. 1a, 1b, 1c, 1d and 1e, the exemplary embodiments of interferometer systems for exemplary embodiments of a method described here are explained in more detail. FIGS. 1a to 1d respectively show Mach-Zehnder-like interferometer systems, while FIG. 1e shows a Fabry-Pérot-like set-up.

Each of the interferometer systems of FIGS. 1a to 1d comprises a detection surface 124 and an optical system having a beam splitter 140 and a beam combiner 144 for providing a first and a second interferometer arm. An input beam 110 incoming through a diaphragm 120 is split into a main beam 112 and a reference beam 114 by means of the beam splitter 140. The main beam 112 is propagated along the first interferometer arm, and the reference beam 114 is propagated along the second interferometer arm. Each of the two interferometer arms contains optical components of the optical system. The first interferometer arm contains a first deflection element 142, and the second interferometer arm contains a second deflection element 146. The deflection elements 142, 146 may be mirrors, for example. In the interferometer systems according to FIGS. 1a, 1b, 1c and 1d, the propagated main beam 112 and the propagated reference beam 114 are combined into an interference beam by means of the beam combiner 144, which is arranged downstream of the beam splitter 140 in the propagation direction of the main beam 112 or the reference beam 114, and interfere on the detection surface 124. The resulting interference pattern is stored digitally or physically as interferogram 126 or as hologram 126. The exemplary embodiments of FIGS. 1a, 1b, 1c and 1d differ in this respect as follows.

The optical system of the exemplary embodiment of FIG. 1a comprises an optical element 130 introduced into the second interferometer arm. For example, the optical element 130 may be a beam rotation element and/or a diffractive optical element. By means of the optical element 130, it is possible to rotate and/or change the reference beam 114 propagating along the second interferometer arm in comparison to the main beam 112 such that in the superposition using the beam combiner 144, rays with different phases respectively interfere. Alternatively or additionally, it is possible for the first interferometer arm to contain an optical element (not shown in FIG. 1).

The optical system of the exemplary embodiment of FIG. 1b comprises a lens 132, which may also be a lens system, introduced into the second interferometer arm. Merely by way of example, a concave lens 132, i.e. a diverging lens, is shown. The reference beam 114 can be focused and/or defocused by means of the lens 132. It is also possible to rotate the reference beam 114 about its own axis by means of the lens (see also FIG. 1c). It is furthermore possible that the phases of the comparative rays of the reference beam 114 can be modulated due to different optical path lengths in the lens 132.

The optical system of the exemplary embodiment of FIG. 1c comprises a first lens 136 introduced into the first interferometer arm and a second lens 134 introduced into the second interferometer arm. The first lens 136 and/or the second lens 134 may also respectively be a lens system. Merely by way of example, the first lens 136 is shown as a concave lens, i.e. as a diverging lens, and the second lens 134 is shown as a convex lens, i.e. as a converging lens. The first lens 136 and the second lens 134 may be designed differently. For example, the two lenses differ in their curvature and/or their refractive power. Furthermore, FIG. 1c shows by way of example the propagation of an input ray 108 of the input beam 110 arranged away from a central ray of the input beam 110. Within the scope of manufacturing tolerances, the central ray coincides with at least one of the optical axes of the lenses.

The input ray 108 is split by the beam splitter 140 into a first main ray 116 of the main beam 112 and a first comparative ray 118 of the reference beam 114. The first main ray 116 is propagated along the first interferometer arm, i.e. in particular by the first lens 136, while the first comparative ray 118 is propagated along the second interferometer arm, i.e. in particular by the second lens 134. In this case, the first main ray 116 is refracted away from the optical axis, while the first comparative ray 118 is first refracted toward the optical axis. A focus is in this case formed behind the ray deflection element 146. Subsequently, the propagated main beam 112 and propagated reference beam 114 are superposed by the beam combiner 144 into an interference beam having a first interference ray 152 and a second interference ray 154. The first interference ray 152 and the second interference ray 154 strike the detection surface 124 at different points, particularly away from a central interference ray 150, which reflects the propagation of the central ray of the input beam 110 through the interferometer arms. The first interference ray 152 contains the first main ray 116, and the second interference ray 154 contains the first comparative ray 118. Due to the different propagations within the two interferometer arms, the first main ray 116 and the first comparative ray 118 thus strike the detection surface 124 at different points.

In one exemplary embodiment, the interferometer system may also comprise only the first lens 136 or the second lens 134. The respectively other lens 134, 136 may however in particular allow an adaptation of the phase fronts of the main beam 112 and the reference beam 114. For example, the respective phase fronts of the main beam 112 and of the reference beam 114 have the same curvature due to the use of two lenses or two lens systems 134, 136.

The optical system of the exemplary embodiment of FIG. 1d comprises a diffractive optical element 138 introduced into the second interferometer arm. For example, the diffractive optical element is an optical lattice 138. By means of the diffractive optical element 138, the phases of the comparative rays of the reference beam 114 may for example be modulated due to different optical path lengths.

The interferometer system of FIG. 1e is based on the set-up of a Fabry-Pérot interferometer. As before in FIG. 1c, the propagation of an input beam 110 including an input ray 108 of the input beam 110 arranged away from a central ray of the input beam 110 is shown by way of example. The interferometer system comprises a diaphragm 120 through which the input ray 110 comes, a beam combiner 144, a beam splitter 140 arranged downstream of the beam combiner 144 in the propagation direction, and a detection surface 124.

The beam splitter 140 and the beam combiner 144 are inclined with respect to the propagation direction of the input beam 110 and in particular are not oriented orthogonally to the propagation direction. Furthermore, the beam combiner 144 has a curvature. The beam combiner 144 can be a further beam splitter and/or a deflection element. The beam splitter 140 may be a curved partially transparent mirror. The beam combiner 144 can have a reflection of at least 80% and at most 95%, for example 90%, and a transmission of at least 5% and at most 15%, for example 10%, at a wavelength of the input beam 110. Although this makes it possible for the input beam 110 to lose much intensity, i.e., for example 90% of the intensity, when passing through the beam combiner 144, the loss in a later reflection is, conversely, lower.

The input beam 110 passes through the beam combiner 144 and is subsequently split by the beam splitter 140 into a main beam 112 and a reference beam 114. In addition, the input ray 108 is split into a first main ray 116 and a first comparative ray 118. The main beam 112 including the first main ray 116 propagates along the original direction of the input beam 110 towards the detection surface 124. The reference beam 114 including the first comparative ray 118 is deflected in the direction of the beam combiner 144 which directs the reference beam 114 through the beam splitter 140 in the direction of the detection surface 124 by means of a further reflection. The main beam 112 and the reference beam 114 interfere as an interference beam comprising a first interference ray 152 and a second interference ray 154. Due to the different propagations of the main beam 112 and of the reference beam 114, the first interference ray 152 and the second interference ray 154 strike the detection surface 124 at different points. The central interference ray 150 again reflects the propagation of the central ray of the input beam 110 through the interferometer arms. The first interference ray 152 contains the first main ray 116, and the second interference ray 154 contains the first comparative ray 118.

The overlap of the main beam 112 and the reference beam 114 on the detection surface 124 can, for example, be adjusted by means of the inclination of the beam combiner 144 and/or the beam splitter 140 with respect to the propagation direction of the input beam 110. By selecting the reflection and transmission of the beam combiner 144, it is possible to adjust an intensity ratio of the main beam 112 and the reference beam 114 in the interference beam. For example, the intensities of the two beams 112, 114 in the interference beam are identical. It may be advantageous to provide a Fabry-Pérot-like interferometer system with a low finesse, since undesired resonance effects, for example in the wavelength, can be avoided in this way.

It is possible that, due to partial re-reflection of the reference beam 114 on the beam splitter 140, further beams with lower intensity could be produced. Such beams can be taken into account in the method described here. For example, a propagator mapping U' which transforms the main beam 112 (E1) into the sum of the reference beam 114 (E2) and said further beam (E2', E2", ... ), U'(E1)=(E2+E2'+E2"+ ... ), may be taken into account for this purpose. In this case, E2 in the above formulae would have to be substituted by (E2+E2'+E2"+ ... ). In this case, the linearity of the field equations can be utilized, whereby a plurality of beams can be combined to form one beam.

On the basis of the schematic representation of FIG. 2, an exemplary embodiment of a method described here is explained in more detail. FIG. 2 shows schematically the reconstruction of the phase of the input beam 110 by using a test beam 170. The test beam 170 is split into two parts by means of a further beam splitter 200. The further beam splitter 200 may be a physical beam splitter, such as a prism, or a digital beam splitter, such as a numerical division, for example. By means of a first portion of the test beam 170, a first beam 172 is generated by reading the hologram 126 formed based on the interference beam.

Furthermore, a propagation mapping is applied to a second portion of the test beam 170 in order to generate a second beam 174. The propagation mapping corresponds to a propagation of the second portion of the test beam 170 through an optical system having a first path length 190, a first further deflection element 202, a second path length 192, a second further deflection element 204 and a third path length 194. The optical system may contain further optical components, such as lenses, prisms and/or small wave plates. The optical system or the propagation mapping corresponds to the optical system of the interferometer system. In other words, the optical system corresponds to a propagation of the main beam 112 through the first interferometer arm and a backpropagation of the propagated main beam 112 through the second interferometer arm. For example, the optical system of the interferometer system corresponding to FIG. 2 exclusively contains beam splitters and deflection elements, for example mirrors.

The first beam 172 and the second beam 174 are superposed by means of a further, digital and/or physical beam combiner 206 and compared to a reference unit 210. If the first beam 172 and the second beam 174 are substantially identical (with the exception of local intensity differences and/or a global phase), the test beam 170 corresponds to the input beam 110, or the main beam 112, or the reference beam 114.

Figure 3:
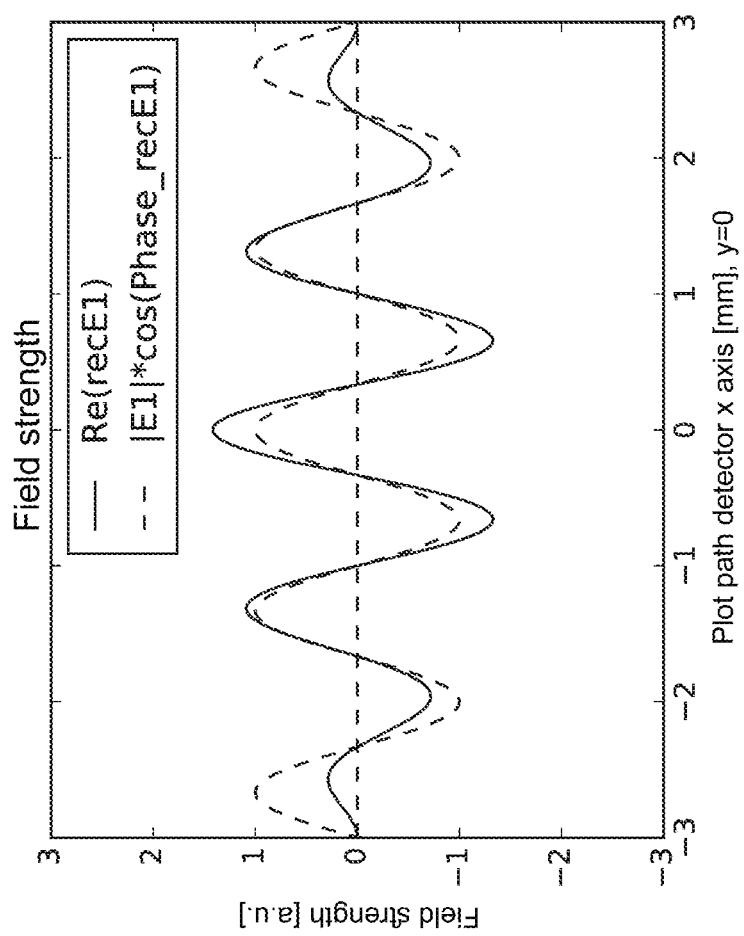
FIGS. 3 to 5 show simulations and measurement results for an exemplary embodiment of a method described here.
Figure 4:
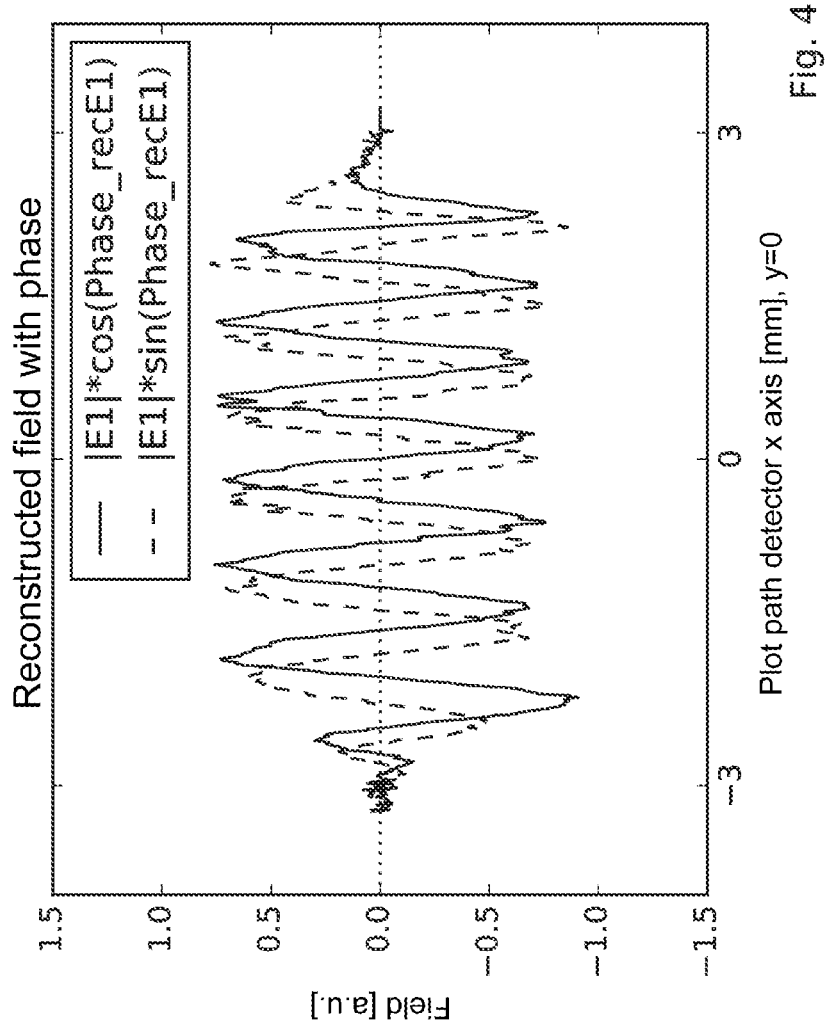
Figure 5:
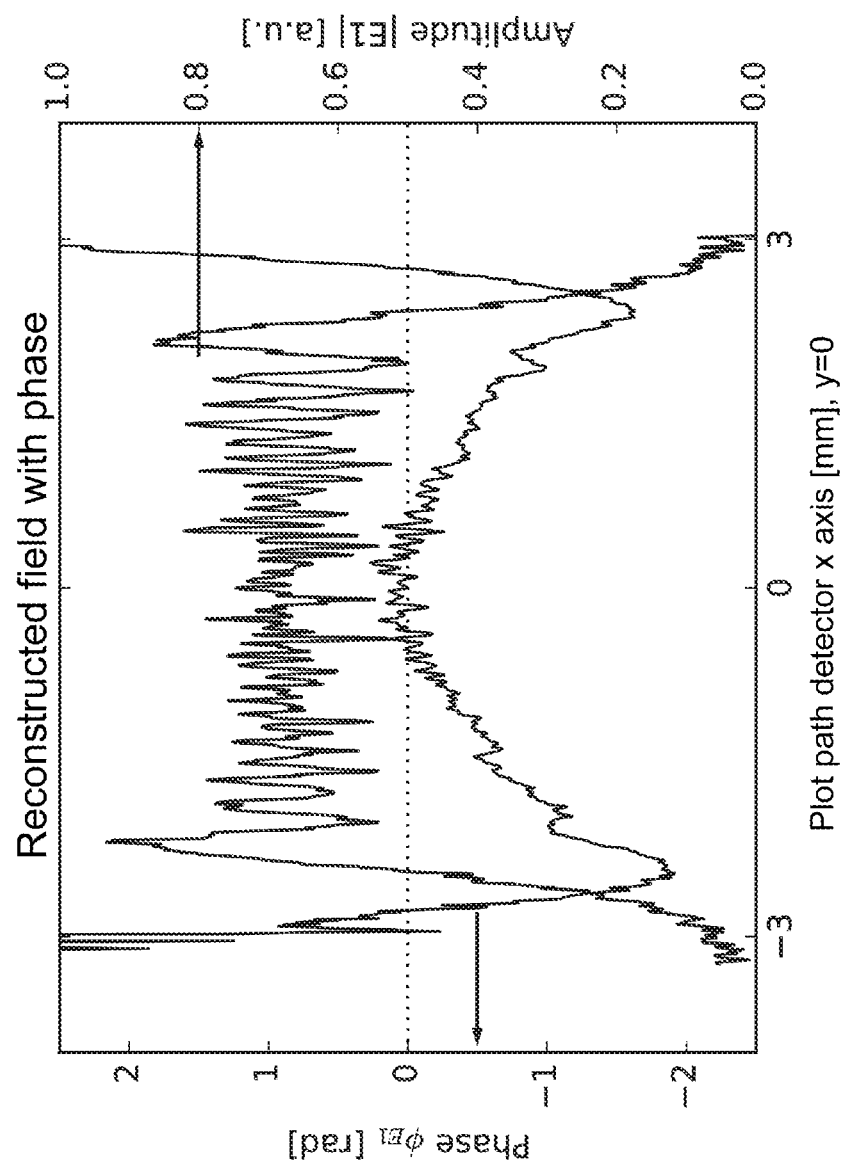

Based on the measurement data of FIGS. 3 to 5, an exemplary embodiment of the method for determining a phase is explained in more detail. In the exemplary embodiment, the method is used, by way of example, for an interferometer system in accordance with the exemplary embodiment of FIG. 1a whose optical system is composed of beam splitters and deflection elements, for example mirrors. The first interferometer arm and the second interferometer arm of the interferometer are designed with different lengths and have a first length L1 and a second length L2, respectively. The input beam 110 is a monochromatic plane wave described by the amplitude factor $\exp(i \cdot k \cdot x)$ and the fixed frequency $\omega$. The propagation direction corresponds to the z axis, and the detection surface 124 corresponds to the x, y plane at z=0.

The input beam 110 is split into a main beam 112 and a reference beam 114. The reference beam 114 is propagated along a second interferometer arm and rotated in the second interferometer arm such that the propagated main beam on the detection surface 124 is rotated by 180° compared to the main beam propagated through a first interferometer arm. A central ray of the reference beam running along the propagation direction serves as an axis of rotation. Furthermore, the propagated reference beam is shifted by a path length dx in comparison to the propagated main beam.

The rotation corresponds to the transformation (x,y)→(-x,-y). For the propagated comparative ray field, the following then applies:

$$E2 \sim \exp[i(k_x[-x-dx]-k_y y+k_z[L2-L1])], \text{ and thus}$$

$$IF_{s,\omega} = \exp[i(k_x[2x+dx]+k_y 2y-k_z[L2-L1])], \text{ where } k_z = \sqrt{(\omega/c)^2-k_x^2-k_y^2}.$$

In the position space, the complex interference term IF corresponds to a point-by-point multiplication with the exponential function shown on the right side of the equation. Alternatively, the complex interference term IF can also be determined with a measurement.

In the exemplary embodiment, a square with an edge length D and M×N pixels is assumed as detection surface 124. For example, the edge length is 6 mm. In the x direction, the indexing is $x_m=-D/2+mD/M$, where m=0, 1 . . . M−1. In the y direction, the indexing is $y_n=-D/2+nD/N$, where n=0, 1 . . . N−1. It is in particular possible for the total number of pixels in the x direction to be the same as the total number of pixels in the y direction (M=N). For even M and N, the center of the detection surface has the indices (N/2, m/2) with (x, y)=(0,0). The polarization of the reference beam remains unchanged in this case.

The amplitude of the propagated main ray field corresponds to the absolute value of the plane wave and can be determined, for example, by blocking the reference beam within the second interferometer arm and merely measuring the propagated main beam on the detection surface. For example, the main beam is a vector field polarized in the x direction, wherein $|E1_x|=1$, $|E1_y|=0$ and $|E1_z|=0$ at z=0.

In a further method step of the exemplary embodiment of the method, the first polarization matrix, the second polarization matrix and thus the polarization matrix are determined by means of a "straight line direction," for example a linearization, of the interferometer system by means of a so-called tunnel diagram. In particular, all reflections on mirrors and other optical elements are unfolded. The beam propagation through the two interferometer arms is further determined from a propagation in free space with refractive index n=1 (vacuum), once over the first length L1 and once over the second length L2. In the second interferometer arm, the displacement by the path length dx must be taken into account.

The propagation matrix of the exemplary embodiment then corresponds to a solution of the Helmholtz equations in Fourier space. The propagation matrix is equivalent to the Rayleigh-Sommerfeld propagator. For propagation between different planes in which z is kept constant, the Rayleigh-Sommerfeld propagator assumes a particularly simple form in Fourier space (see, for example, Diffraction, Fourier Optics and Imaging, Okan K. Ersoy, Wiley Interscience 2007, Angular Spectrum of Plane Waves, chapter 4.3, and Fast Fourier Transform (FFT) Implementation of the Angular Spectrum of Plane Waves, chapter 4.4.).

The first propagation matrix and the second propagation matrix, in which the rotation was not yet taken into account, read as follows in Fourier space:

$$\hat{U}1_{t,pm',qn',s,pm,qn,\omega} = \delta_{s,t}\delta_{pm,pm'}\delta_{qn,qn'}e^{iL1\sqrt{(\omega/c)^2-pm^2-qn^2}},$$

$$\hat{U}2'_{t,pm',qn',s,pm,qn,\omega} = \delta_{s,t}\delta_{pm,pm'}\delta_{qn,qn'}e^{iL2\sqrt{(\omega/c)^2-pm^2-qn^2}}.$$

Here, pm, pm', qn, qn' are the k vectors for the indices in Fourier space, matching the selected indexing in the position space, and $\delta_{pm,pm'}$, $\delta_{qn,qn'}$ are Kronecker functions. The following applies:

$$pm = \frac{2\pi}{D}m \text{ for } m = 0, \ldots, M-1$$

and $$qn = \frac{2\pi}{D}n \text{ for } n = 0, \ldots, N-1.$$

In the exemplary embodiment, U1 and U2' in Fourier space are thus unitary diagonal matrices.

The Fourier transformation FT of the field $E_{s,m',n'}$ in the position space into the field $\hat{E}_{s,pm,qn}$ in Fourier space and the corresponding Fourier backtransformation $FT^{-1}$ read as follows:

$$\hat{E}_{s,pm,qn} = \sum_{m'=0}^{M-1}\sum_{n'=0}^{N-1} E_{s,m',n'}e^{-2\pi i m'm/M}e^{-2\pi i n'n/N} =: FT(E),$$

$$E_{s,m,n} = \frac{1}{MN}\sum_{m'=0}^{M-1}\sum_{n'=0}^{N-1} \hat{E}_{s,pm',qn'}e^{2\pi i m'm/M}e^{2\pi i n'n/N} =: FT^{-1}(\hat{E}).$$

Here, the constant index ω was suppressed.

The product of the second propagation matrix and the inverse of the first propagation matrix must be formed in order to determine the propagation matrix. In addition, the displacement by the path length dx and the rotation by 180° must be taken into account.

According to the Fourier theory, the displacement by dx in Fourier space corresponds to a multiplication with a phase factor exp(−i·dx·pm). The rotation in position space corresponds to the transformation (x,y)→(−x,−y) (see above); in the indices of the detection surface, this corresponds to the transformation (m,n)→(M−m,N−n). For even M and N, the doublet (m,n)=(M/2,N/2) is a fixed point of rotation. Rotation by 180° in position space also results in a rotation by 180° in Fourier space, i.e. $(p_m,q_n)→(-p_m,-q_n)$.

Below, index points outside the detection surface, that is to say outside the index range, are brought into the index range by addition/subtraction. For example, the pixel having the index (M,N) corresponds to the pixel having the index (0,0). The pixel with the index (0,0) can be a further fixed point in the modeling of the rotation. This can be caused by the periodic Fourier boundary conditions. This addition/subtraction does have an influence on the choice of propagation matrix but not on the determination of the input beam. In particular, in the exemplary embodiment, the main beam and the reference beam and thus also the input beam are real fields in which no boundary conditions are assumed at the outer regions of the detection surface.

Overall, the propagation matrix in Fourier space and, by corresponding Fourier backtransformation, the propagation matrix in position space thus result:

$$\hat{U}_{t,pm',qn',pm,qn,\omega} = e^{-i\,dx\,pm}\delta_{-pm,pm'}\delta_{-qn,qn'}e^{i(L2-L1)\sqrt{(\omega/c)^2 - pn^2 - qn^2}}$$

$$U_{t,m',n',s,m,n,\omega} =$$

$$\frac{\delta_{s,t}}{MN}\sum_{m''=0}^{M-1}\sum_{n''=0}^{N-1}e^{-2\pi i m'm''/M}e^{-2\pi i n'n''/N}e^{-i\,dx\,pm}e^{i(L2-L1)\sqrt{(\omega/c)^2 - pm''^2 - qn''^2}}$$

$$e^{-2\pi i m''m/M}e^{-2\pi i n''n/N}$$

For example, these formulae can be calculated and/or applied by means of so-called Fast Fourier Transform (FFT) routines. For example, Python Scipy is suitable for this purpose.

In a further method step of the exemplary embodiment, the complex phase-matching factor is determined by phase matching. For this purpose, the complex interference term IF and the propagation matrix are calculated approximately for exactly the same difference between the first and the second length. This results in a phase-matching factor $f(\omega)=1$.

In a further method step, the phase of the input beam is determined by means of the propagation matrix of the optical system and the measured interferogram. For this purpose, the conditional equation (6) is solved, wherein the index $\omega$ is suppressed. The equation to be solved thus reads as follows:

$$\overline{IF_{t,m,n,\omega}}E1_{t,m,n,\omega} = \sum_{s,u,v}U_{t,m,n,s,u,v,\omega}E1_{s,u,v}, \quad (6b)$$

wherein the conjugate of the complex interference term IF in Fourier space generates the following transformation of the main beam E1:

$$\hat{E}1_{s,pm,qn} \rightarrow e^{-i(k_x dx - k_z[L2-L1])}\hat{E}1_{s,pm-2kx,qn-2ky}.$$

Thus, the reformulated equation (6b) in Fourier space reads:

$$e^{i(-k_x dx + k_z[L2-L1])}\hat{E}1_{s,pm-2kx,qn-2ky} - e^{-i\,dx\,pm}e^{i(L2-L1)\sqrt{(\omega/c)^2 - pm^2 - qn^2}}$$

$$\hat{E}1_{s,-pm-qn} = 0.$$

This equation is an eigenvalue equation for $E1_{s,pm,qn}$ for eigenvalue 0. Inserting shows that the eigenvalue equation is satisfied for $p_m - 2k_x = -p_m$ and $q_n - 2k_y = -q_n$.

This means that for $k_x = 2\pi \cdot m_{in}/D$ and $k_y = 2\pi \cdot n_{in}/D$, where $m_{in}$ and $n_{in}$ are integers and $m_{in} = 0, \ldots M-1$; $n_{in} = 0 \ldots N-1$, the system of equations has the following solution for the reconstructed field with the exception of one phase (and the normalization):

$$rec\hat{E}1_{s,pm,qn} = \begin{cases} 1 & \text{for } m = m_{in}, n = n_{in}, s = 1 \\ 0 & \text{otherwise} \end{cases}$$

This corresponds to the Fourier transform of the main beam. A numerical calculation can also show that the solution is also stable. There is thus no further solution to the equation, for example for $L2-L1=1$ cm. Moreover, it can be shown numerically that for non-integer $m_{in}$ and/or $n_{in}$, equation (6b) has a unique approximate solution. The solution for the lowest eigenvalue is sought in this case. The numerical results for $m_{in}=4.5$ and $n_{in}=0$ are shown in FIG. 3.

FIG. 3 shows the amplitude of the real part of the field for $recE1_{1,m,N/2}$ and for a wave in which the phase of $recE1_{1,m,N/2}$ but the amplitude of the main beam 112 is used, along the x axis, i.e. for the indices $m=0 \ldots$ M for $y=0$. In the latter solution, in which only the phase of the reconstructed solution is used, the system of equations (6b) is thus used only for phase determination. $m_{in}=4.5$ was used for this numerical example. This can be seen in FIG. 3 by counting the nodal lines. The input field E1 is thus not periodic in the viewing window of the discretization. However, the numerical method provides the correct result for the phase. In particular, the dashed line corresponds to the input field E1. This shows the high stability of the method, even if the data or the propagator mapping are in particular slightly erroneous. As a result, this provides a solution that corresponds in the phase to the main beam E1 up to $2 \cdot 10^{-4}$ rad. The reason for the deviation can be the different treatment of the fields at the edge of the detection surface.

FIG. 4 shows a measurement of a first and a second data set for a field along the x axis, i.e. for the indices $m=0 \ldots$ M for $y=0$. Two data sets in the conditional equation (6b) were used in the measurement. In the first data set, the path length $dx=0$ pixels, and in the second data set, the path length $dx=4.9$ pixels. The reference beam was rotated by a rotational angle of 176.1°. The path difference L1-L2 is 1.65 mm. The phase of the complex interference term IF was determined according to the phase shifting method using an 8-bit detector.

The input beam of the exemplary embodiment is a Gaussian beam diffracted on an iris diaphragm. The diffraction on the iris diaphragm corresponds to a so-called Fresnel diffraction. By using a method described herein, the measured Fresnel diffraction can be compared to the theory. Conclusions about the effectiveness of the method can be drawn thereby.

The beam incidence is slightly obliquely to the optical axis, comparable to the incidence of the plane wave in the example of FIG. 3. The structuring of the plane wave interference visible in FIG. 4 is reproducible and represents the influence of the Fresnel diffraction. The diffraction effects are shown in more detail in FIG. 5. For this purpose, the phase influence coming from the oblique incidence is compensated and the results are shown in relation to a straight incidence.

FIG. 5 shows the phase and amplitude of the main beam on the detection surface, which is arranged 200 mm after the iris diaphragm for Fresnel diffraction. The variations and oscillations shown, both in the amplitude of the main beam |E1| and in the phase $\Phi_{E1}$, can be reproduced up to $1 \cdot 10^{-2}$ rad by means of independent measurements. The measured data are compatible with a so-called boundary wave simulation of the diffraction on the iris diaphragm. For this verification, the measured field was numerically propagated in the z direction up to the position of the diaphragm. A good match to the theoretical expectation, which is a "cut-off" field on the diaphragm, results.

The explicit calculation and the results of the method for the exemplary embodiment shown in the figures show that, even under unfavorable conditions, the reconstructed field $recE1_{1,m,n,\omega}$ contains the solution for the correct phase. However, the reconstructed field does not necessarily contain the correct amplitude.

The phase determination described herein without a reference ray, in particular the scalar and vectorial phase determination without a reference ray, results in several advantages. In particular, the elimination of an in particular external can lead to a maximum flexibility in the design of the interferometer systems to be evaluated, since even complicated situations can be detected without approximation in a phase determination without a reference ray. The requirements for the coherence length of the field used are also reduced; as a result, the Fourier transform property of interferometers in the time/frequency domain can, for example, be used. Field measurement at different frequencies is also conceivable. The exact systematic method in the formalism is also compatible with Fourier optics and pulsed lasers. The method described here allows the digital method enables the numerical determination of the phase of any input field.

In addition, the method can be used in metrology, in the quality control of workpieces in production, in three-dimensional surface inspection, in the testing of the authenticity of banknotes, in holographic microscopy with three-dimensional, in particular high resolution (so-called super resolution), in three-dimensional diffraction tomography, x-ray tomography and/or neutron beam tomography. Relative distance determinations in semitransparent objects, for example in terahertz separation of an object behind a semitransparent wall, are also possible.

The method for the determination of the phase without a reference ray has been tested successfully both numerically and experimentally (see FIGS. 4 and 5 in this respect). The phase reconstruction takes place with an accuracy determined by the detector used, i.e. an 8-bit detector allows a phase determination with a highest accuracy of approximately 2E-8 bits, i.e. 0.004 rad. An accuracy of about 0.01 rad was achieved experimentally under these conditions. This constitutes a favorable agreement with the experimental results.

The description on the basis of the exemplary embodiments and/or the description on the basis of the theoretical models does not limit the invention thereto. Rather, the invention encompasses any new feature as well as any combination of features, including in particular any combination of features in the claims, even if this feature or combination itself is not explicitly specified in the claims, the exemplary embodiments and/or the theoretical models, for example, the construction of ultra-compact interferometer systems for phase measurement, which can optionally also be designed as "internal reflection devices," and can digitally measure the phase of a light field at one or more wavelengths.

Various applications of the method are conceivable as a result of the described advantages. For example, the physical method using a physically stored hologram enables the determination or detection of a complex input field having a phase by checking the input field against the hologram. Only when reading the hologram indicates a match with the internally generated test ray, is the input field the field used for the generation of the hologram. The input field cannot be derived from the hologram itself. Such a method is suitable for authenticity verification and cryptography, for example in the context of asymmetric encryption methods.

LIST OF REFERENCE SIGNS

108 Input ray
110 Input beam
112 (Propagated) main beam
114 (Propagated) reference beam
116 First main ray
118 First comparative ray
120 Diaphragm
124 Detection surface
126 Hologram
130 Optical element
132 Lens
134 Second lens
136 First lens
138 Diffractive optical element
140 Beam splitter
142 First deflection element
144 Beam combiner
146 Second deflection element
150 Central interference ray
152 First interference ray
154 Second interference ray
170 Test beam
172 First beam
174 Second beam
190 First path length
192 Second path length
194 Third path length
200 Further beam splitter
202 First further deflection element
204 Second further deflection element
206 Further beam combiner
210 Reference unit

The invention claimed is:

1. A method for determining at least one phase of an input beam using an interferometer system, wherein the interferometer system comprises a detection surface and an optical system including a first interferometer arm and a second interferometer arm, wherein the interferometer system further comprises a beam splitter and a beam combiner, wherein the input beam comprises a plurality of input rays each including a phase, the method comprising:

splitting the input beam into a main beam and a reference beam using the beam splitter such that each input ray is split into a main ray of the main beam and a comparative ray of the reference beam, wherein the main ray and the comparative ray are uniquely assigned to each input ray;

propagating the main beam along the first interferometer arm and the reference beam along the second interferometer arm;

superposing the propagated main beam and propagated reference beam using the beam combiner to form an interference beam including a plurality of interference rays;

generating a hologram by:
propagating the interference beam onto the detection surface; and
measuring at least one interference pattern of the interference beam;

determining a propagator mapping of the optical system, wherein the propagator mapping describes a propagation of the propagated main beam into the propagated reference beam;

reading out the hologram with at least a portion of a test beam including a test phase to generate a first beam;

generating a second beam that is digitally represented by applying the propagator mapping to at least a portion of the test beam;

comparing the first beam and the second beam; and determining at least a portion of the phase of the input beam from the test phase of the test beam;

repeating said reading out the hologram, said applying the propagator mapping, said comparing the first beam and the second beam until the first beam and the second beam are substantially identical except for at least one of local intensity differences or a global phase; and said propagating the main beam along the first interferometer arm and the reference beam along the second interferometer arm takes place in such a way that at least a portion of the interference rays of the interference beam is in each case a superposition of a main ray of the propagated main beam assigned to a first input ray of the input beam, and of a comparative ray of the propagated reference beam assigned to a second input ray of the input beam different from the first input ray.

2. The method of claim 1, wherein said propagating the main beam along the first interferometer arm and the reference beam along the second interferometer arm takes place such that an interference ray of the interference beam comprises a superposition of a main ray of the propagated main beam assigned to a first input ray of the input beam and of a comparative ray of the propagated reference beam assigned to a second input ray of the input beam identical to the first input ray.

3. The method of claim 1, wherein the test beam is arbitrarily selected from a set of beams that become a first beam when applying the propagator mapping.

4. The method of claim 1, wherein at least one of the first interferometer arm or the second interferometer arm comprises a beam rotation element, and wherein said propagating the main beam along the first interferometer arm and the reference beam along the second interferometer arm further comprises:

rotating at least one of the main beam or the reference beam about an axis of rotation extending along the propagation direction by a rotational angle using the beam rotation element.

5. The method of claim 1, wherein at least one of the first interferometer arm or the second interferometer arm of the optical system comprises at least one lens, and wherein said propagating the main beam along the first interferometer arm and the reference beam along the second interferometer arm further comprises:

at least one of focusing or defocusing at least one of the main beam or the reference beam with the at least one lens.

6. The method of claim 1, wherein said determining the propagator mapping further comprises:

determining a first propagator mapping describing the propagation of the input beam through the beam splitter and along the first interferometer arm;

determining a second propagator mapping describing a propagation of the input beam through the beam splitter and along the second interferometer arm;

inverting the first propagator mapping; and multiplying the inverse of the first propagator mapping with the second propagator mapping in order to determine the propagator mapping.

7. The method of claim 1, wherein the interferometer system further comprises a beam source configured to emit an initial beam propagating along a propagation direction wherein the initial beam comprises a plurality of initial rays, wherein the method further comprises:

irradiating at least a portion of an object with the initial beam such that at least a portion of the initial rays of the initial beam are transformed by reflection on object points of an outer surface of the object into the plurality of input rays of the input beam, wherein the phase of each input ray is a phase shift with respect to an unambiguously bijectively assigned initial ray of at least a portion of the initial rays.

8. The method of claim 1, wherein the detection surface is configured to store the hologram, wherein the method further comprises:

reading the hologram in order to reconstruct the holographic mapping of the object, wherein the reading includes diffracting at least one of the reference beam or the main beam on the hologram.

9. The method of claim 1, comprising at least one of:

selecting a frequency of the test beam which is part of a spectrum of the main beam and determining the hologram at the frequency;

determining at least one of an intensity or amplitude of at least one of the propagated main beam or the propagated reference beam on the detection surface at the frequency of the test beam;

determining a complex interference term of the hologram at the frequency of the test beam; and determining a complex phase-matching factor which takes into account possible scales and total phase differences between the determination of the propagator mapping and the complex interference term.

10. The method of claim 9, wherein said determining at least one of an intensity or amplitude of at least one of the propagated main beam or the propagated reference beam and said determining a complex interference term of the hologram are performed using at least one of a phase shifting method or a carrier phase method.

* * * * *